United States Patent
Tournebize et al.

(10) Patent No.: US 11,904,503 B2
(45) Date of Patent: Feb. 20, 2024

(54) DOSAGE CONTROL IN THE MANUFACTURE OF TIRES

(71) Applicant: COMPAGNIE GENERALE DES ETABLISSEMENTS MICHELIN, Clermont-Ferrand (FR)

(72) Inventors: Aurelien Tournebize, Clermont-Ferrand (FR); Sebastien Lafond, Clermont-Ferrand (FR); Jean-Claude Sabatier, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 977 days.

(21) Appl. No.: 16/634,373

(22) PCT Filed: Jul. 24, 2018

(86) PCT No.: PCT/EP2018/070032
§ 371 (c)(1),
(2) Date: Jan. 27, 2020

(87) PCT Pub. No.: WO2019/020622
PCT Pub. Date: Jan. 31, 2019

(65) Prior Publication Data
US 2020/0254651 A1 Aug. 13, 2020

(30) Foreign Application Priority Data

Jul. 27, 2017 (FR) ...................................... 1757150

(51) Int. Cl.
| | | |
|---|---|---|
| B29B 7/24 | (2006.01) | |
| B29B 7/00 | (2006.01) | |
| B29B 7/28 | (2006.01) | |
| B29B 7/74 | (2006.01) | |
| B29B 15/02 | (2006.01) | |

(52) U.S. Cl.
CPC .............. *B29B 7/244* (2013.01); *B29B 7/005* (2013.01); *B29B 7/286* (2013.01); *B29B 7/7495* (2013.01); *B29B 15/023* (2013.01)

(58) Field of Classification Search
CPC ....... B29B 7/7495; B29B 7/568; B29B 7/566; B29B 7/7461; B29B 7/7485; B29B 7/724; B29B 7/68; B29B 7/728; B29B 7/183; B29B 7/82; B29B 7/726; B29B 7/748; B29B 7/826; B29B 7/823; B29B 7/244; B29B 7/005; B29B 7/286; B29B 15/023; B29B 15/02; B29D 30/06
See application file for complete search history.

(56) References Cited

U.S. PATENT DOCUMENTS

| | | | | |
|---|---|---|---|---|
| 3,690,391 | A * | 9/1972 | Rust ...................... | G01G 13/00 177/60 |
| 4,136,749 | A * | 1/1979 | Di Rosa ................ | B29B 7/7495 83/77 |
| 4,214,640 | A * | 7/1980 | Di Rosa ................ | G01G 19/38 83/77 |
| 4,280,575 | A * | 7/1981 | di Rosa ................ | B29B 15/023 177/DIG. 11 |
| 4,322,803 | A * | 3/1982 | Ullner .................... | G01G 19/38 241/34 |
| 2022/0105660 | A1* | 4/2022 | Tanabe .................. | B29B 15/023 |
| 2023/0226722 | A1* | 7/2023 | Barriere ................ | B29B 7/60 366/77 |

FOREIGN PATENT DOCUMENTS

| | | | | | |
|---|---|---|---|---|---|
| FR | 3049888 | A1 * | 10/2017 | ............. | B29B 15/02 |
| FR | 3049889 | A1 * | 10/2017 | ............. | B29B 15/02 |
| GB | 2027639 | A * | 2/1980 | ........... | B29B 15/023 |
| GB | 2 028 518 | A | 3/1980 | | |
| JP | 6-190783 | A | 7/1994 | | |
| WO | WO-2019020622 | A1 * | 1/2019 | ............. | B29B 15/02 |

OTHER PUBLICATIONS

International Search Report dated Sep. 4, 2018, in corresponding PCT/EP2018/070032 (3 pages).
B. Lightle, "Automating the Rubber Compounding Process", IEEE Transactions on Industry Applications, IEEE Service Center, vol. 29, No. 6 (1993).
Rothemeyer, "Kautschuk Technologie", Dec. 31, 2001, pp. 378-382, XP055460574, retrieved from the internet: URL:https://www.hanser-elibrary.com/isbn/9783446437760 (retrieved on Mar. 19, 2018).

* cited by examiner

*Primary Examiner* — Charles Cooley
(74) *Attorney, Agent, or Firm* — VENABLE LLP

(57) ABSTRACT

In the field of tire production, the invention relates to methods and systems for creating unvulcanized rubber batches prior to mixing them in a rubber mixer, including selecting at least one batch for mixing in the mixer, wherein each batch corresponds to a selection of rubber bales ($A_I$, $B_I$, $C_I$) each corresponding to a rubber nature (A, B, C) having predefined characteristics, in order to obtain a proportion corresponding to a predetermined proportion, a target weight to attain a difference between (a) the required weight of the batch and (b) the sum of the weight of the bales ($A_I$, $B_I$, $C_I$) and the weight of the pieces ($A_{IJ}$, $B_{IJ}$, $C_{IJ}$).

18 Claims, 24 Drawing Sheets

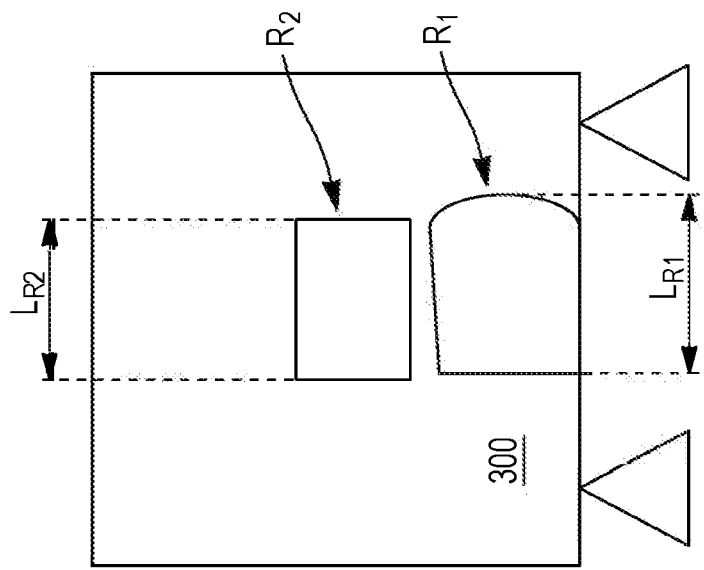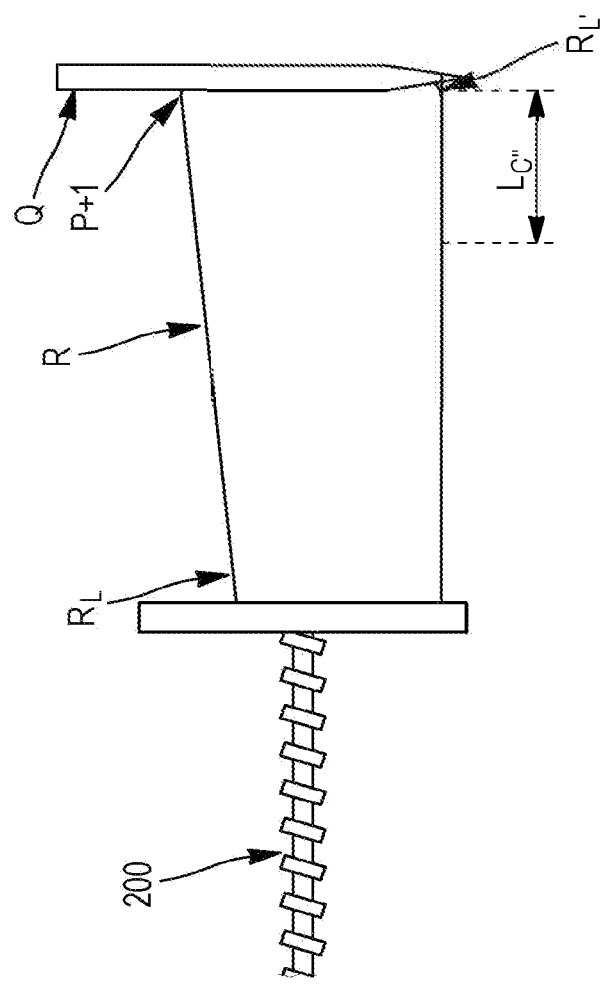
FIG. 23B
FIG. 23A

DOSAGE CONTROL IN THE MANUFACTURE OF TIRES

TECHNICAL FIELD

The disclosed invention relates generally to the production of rubber mixtures and vehicle tires made therefrom. More particularly, the disclosed invention relates to efficiency attained in the production of rubber mixtures by cutting and weighing the rubber before it is fed to a mixer.

BACKGROUND

In the fabrication of tires, a rubber mixture can be chosen from among a variety of rubber mixtures, each having different ingredients that are mixed in different quantities and derived from a variety of rubber mixture recipes. These recipes require the mixture of batches of non-vulcanized rubber (natural or synthetic) in predetermined mass proportions (also referred to as "dosage"). Each batch includes one or several types of rubber that, after mixing, confer desired properties to the tire.

Each rubber type is typically furnished in the form of bales of rubber of predetermined weight and volume. Each rubber bale must be weighed in order to respect the weights determined by the recipe. In order to carry out this weighing, the bales are transported toward a guillotine having at least one blade. The guillotine cuts the bales into pieces that will serve to feed a mixer as a rubber batch.

For the same kind and grade of elastomer, the properties of this elastomer may vary from one supplier to another and even from one lot to another for the same supplier. In order to obtain the most homogeneous properties possible, the disclosure explains how to constitute a batch using, for the same kind and the same grade of elastomer, different batches that can come from different suppliers. Another advantage is that the tire manufacturer does not depend on a single source of rubber (i.e., either a single supplier or a single supply from a main supplier) to achieve its production objectives.

Because each batch is introduced into a rubber mixer in predetermined proportions, precise metering solutions are required, while maintaining the integrity of the various properties of the rubber.

SUMMARY

The invention provides a method for creating batches of unvulcanized rubber before their mixture in a rubber mixer, including selecting at least one batch for mixing in the mixer, wherein each batch corresponds to a selection of rubber bales each corresponding to a nature of rubber having predefined characteristics.

According to one embodiment of the invention, the method includes a step of providing a bale supply station where unvulcanized rubber bales are provided from the corresponding rubber natures. The method also includes steps of selecting unvulcanized rubber bales in natures and in a predetermined proportion that correspond to a batch selected at the bale supply station; and providing a cutting station for cutting at least one bale into pieces. The process includes also the steps of providing a transport system that feeds the cutting station and transfers the rubber bales and the rubber pieces to at least one mixer; weighing the bales and the pieces in order to obtain a sum of a weight of the bales and a weight of the pieces; comparing the sum obtained with the required weight of the batch, in which the batches are created by mixing different kinds and different grades of elastomers; and obtaining, in a proportion corresponding to the predetermined proportion, a targeted weight in order to realize a difference between the sum obtained and the required weight of the batch.

In one embodiment, the step of obtaining, in a proportion corresponding to the predetermined proportion, a target weight to attain a difference between the sum of the weight obtained and the required weight of the batch, further includes the steps of providing a reference rubber bale of a predetermined rubber nature and a predetermined proportion that corresponds to a selected batch at the bale supply station, the supplied reference rubber bale having a predefined weight and a predefined length between one end and an opposite end; and determining a cutting length and cutting position of the reference rubber bale that are required to obtain the required weight of the batch.

In one embodiment, the step of determining the cutting length and the cutting position includes the steps of adjusting the position of the reference rubber bale until the opposite end is brought into contact with the side of a blade that performs the step of cutting the reference rubber bale at the cutting position; weighing the reference rubber bale; calculating the cutting length and the cutting position of the learning cut using the weight of the reference rubber bale, which is either the predefined weight or the weight obtained by weighing the reference rubber bale; cutting the reference rubber bale at the cutting position of the learning cut; and weighing a first piece that is obtained by cutting the reference rubber bale at the cutting position to obtain a real weight of the piece.

In one embodiment, the step of adjusting the position of the reference rubber bale is performed by a linear actuator that enters into contact with the end of the rubber bale.

In one embodiment, the method also includes the steps of calculating a cutting length and a cutting position of a successive cut using the weight and the length obtained from the first piece and a target weight of a complementary piece; cutting the reference rubber bale at the cutting position of the successive cut; and weighing the complementary piece that is obtained by cutting the reference rubber bale at the cutting position of the successive cut in order to obtain a real weight of the complementary piece.

In one embodiment, the method further includes the steps of calculating a cutting length and a cutting position of a final cut using the weight and length obtained from the complementary piece and a target weight of a final piece; cutting the reference rubber bale at the cutting position; and weighing the final piece that is obtained by cutting the reference rubber bale at the cutting position to obtain a real weight of the final piece remaining after the complementary cut.

In one embodiment, the step of determining a cutting length and a cutting position is performed iteratively until the sum obtained of the weight of the bales, the weight of the pieces and the weight of the pieces obtained from the reference rubber bale is equal to the required weight of the batch in a proportion corresponding to a predetermined proportion.

In one embodiment, the method also includes the step of transporting the bales and the pieces between the supply station, the cutting station and the mixer according to a sequence determined by the equivalence between the required weight of the batch and a) the weight of the bales or (b) a sum of the weight of the bales and a weight of the pieces.

In one embodiment, the method further includes the steps of providing a weighing station for weighing the bales and the pieces; and providing a storage station for holding the pieces between successive cycles of batch creation.

In one embodiment, the transport system includes a feed belt for feeding the cutting station, and conveyor belts that carry the bales and the pieces in order to feed the mixer for batch creation. The conveyor belts include at least one scale.

In one embodiment, the method further includes the step of weighing the pieces in order to obtain the sum of the weight of the bales and the weight of the pieces.

In one embodiment, the method further includes the step of storing the pieces for the next batch creation cycle, wherein a cumulative weight of the stored pieces is compared to the required weight of the next batch.

In one embodiment, the method further includes programming sequences for the transport system such that a predetermined sequence can be selected from a plurality of sequences.

In one embodiment, the method further includes mixing the batch in the rubber mixer.

The invention also provides a system for creating unvulcanized rubber batches prior to mixing them in a rubber mixer, including a selection of at least one batch for mixing in the mixer, wherein each batch corresponds to a selection of rubber bales that each correspond to a rubber nature having predefined characteristics. The system includes a bale supply station where unvulcanized rubber bales are provided from the corresponding rubber natures. The system also includes a cutting station that cuts at least one bale into pieces, and a weighing station for weighing the bales and the pieces removed therefrom. The system further includes a transport system that transfers the bales and the rubber pieces to at least one mixer and transports the bales and the pieces between the supply station, the cutting station and the mixer according to a sequence determined by attaining an equivalence between a sum of a bale weight and a weight of the pieces and the required weight of the batch in a proportion corresponding to the predetermined proportion.

In one embodiment, the system further includes at least one linear actuator that adjusts a position of a reference rubber bale of a predetermined rubber nature and proportion that corresponds to a batch selected at the bale supply station, the supplied reference rubber bale having a predefined weight and a predefined length between an end and an opposite end, until the opposite end is brought into contact against the side of a blade that carries out the step of cutting the reference rubber bale at the position of a learning cut.

In one embodiment, the blade is provided at the cutting station in order to perform a step of determining cutting lengths and cutting positions of the reference rubber bale to realize a difference between the sum of the weights of the bales and the weight of the pieces and the required batch weight.

In one embodiment, the system performs the step of determining cutting lengths and cutting positions iteratively until the resulting sum of the weight of the bales, the weight of the pieces and the weight of the pieces obtained from the reference rubber bale is equal to the required weight of the batch in a proportion corresponding to a predetermined proportion.

In one embodiment, the transport system includes a feed belt for feeding the cutting station, and conveyor belts that carry bales and pieces to feed the mixer for creating the batch. The conveyor belts include at least one scale.

In one embodiment, the system further includes at least one rubber mixer for mixing the batch.

The invention also proposes an assembly for manufacturing tires that includes the disclosed system.

Other aspects of the presently disclosed invention will become readily apparent from the following detailed description.

BRIEF DESCRIPTION OF THE DRAWINGS

The nature and the various advantages of the invention will become clearer upon reading the following detailed description, taken in conjunction with the accompanying drawings, in which like references refer to comparable elements, and in which:

FIGS. 20 to 24B represent another embodiment of the invention.

DETAILED DESCRIPTION

Figure 1:
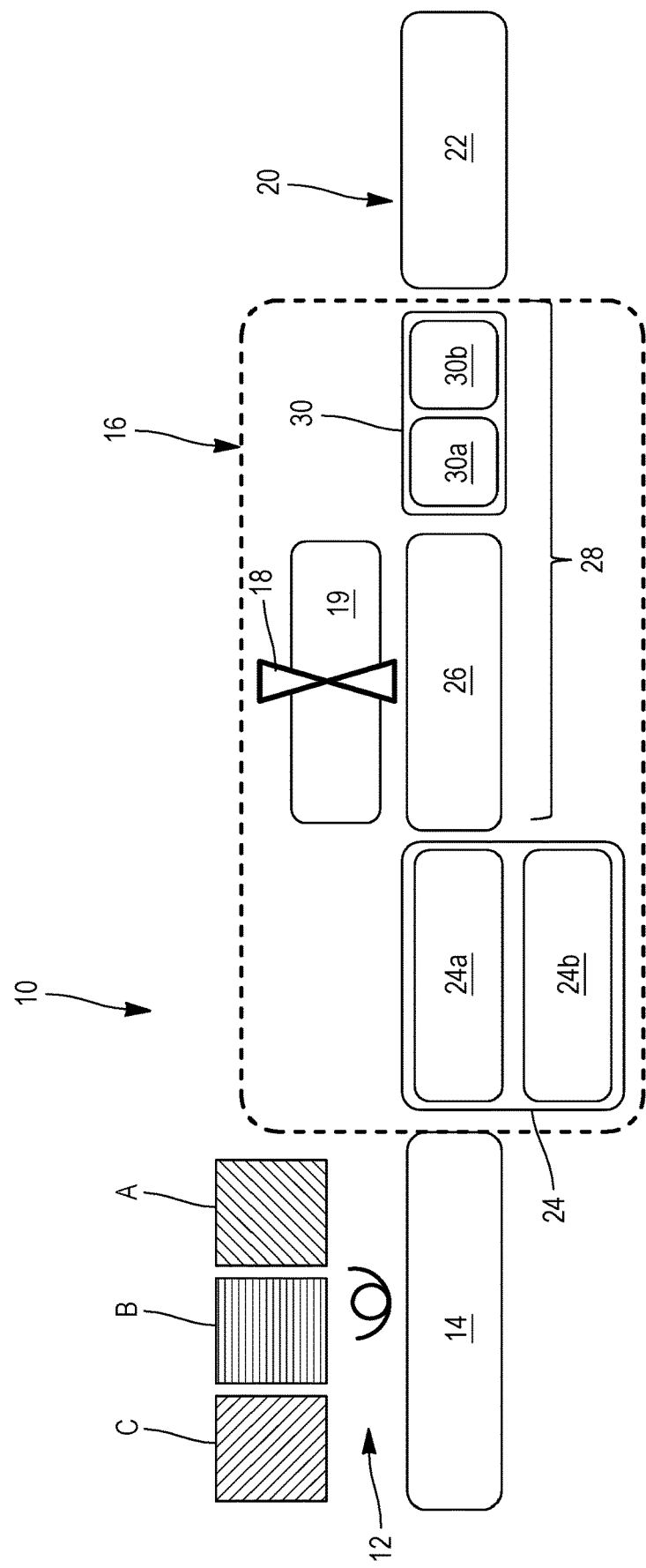
FIG. 1 is a schematic view of an embodiment of a system for cutting rubber according to the invention.

Reference will now be made in detail to embodiments of the invention, one or more examples of which are illustrated in the drawings. Each example is provided by way of explanation and not limitation of the described invention. It will be understood by those skilled in the art that various modifications and variants may be applied in the present invention without departing from the scope or spirit of the invention.

Referring now to the figures on which the same numbers identify identical elements, FIGS. 1 to 15 show an example of a system 10 for creating batches of rubber to be mixed. Each batch corresponds to a selection of one or more rubber bales that can be classified by type (e.g., BR, SBR, IR . . . ) and by grades. Different types and different grades have different properties, but it is also possible that, for the same kind and grade, the properties differ according to the batch of the same supplier.

It is contemplated that system 10 allows the production of a rubber mixture having various and varied properties as determined by the performance requirements of the resulting tire. As used herein, the term "tires" includes, but is not limited to, tires used for light vehicles, passenger cars, commercial vehicles (including heavy vehicles), recreational vehicles (including, without limitation, bicycles, motorcycles, ATVs, etc.), agricultural vehicles, military vehicles, industrial vehicles, mining vehicles and construction equipment. It is also contemplated that the products made by the present invention include complete and partial tire treads such as those used in known retreading processes.

Referring to FIG. 1, the system 10 creates the selected rubber batches before delivery of the batches to a mixer having a chamber of a predetermined filling volume for receiving and mixing the batches. The mixer (not shown) is selected from known varieties.

The batches are created by mixing different types and grades of elastomers. Each type and grade designates an elastomer whose properties are known. However, a type and grade may include lots that have different properties (e.g., different dates of manufacture, different delivery dates from the supplier, etc.). In order to guarantee a homogeneous product, each batch includes rubbers of different types and grades from different suppliers or different lots from the same supplier. In the remainder of the description, the various kinds, grades, species, lots and batches of elastomers of the same supplier or of a different supplier will be designated by the term "nature" of elastomer.

Figure 2:
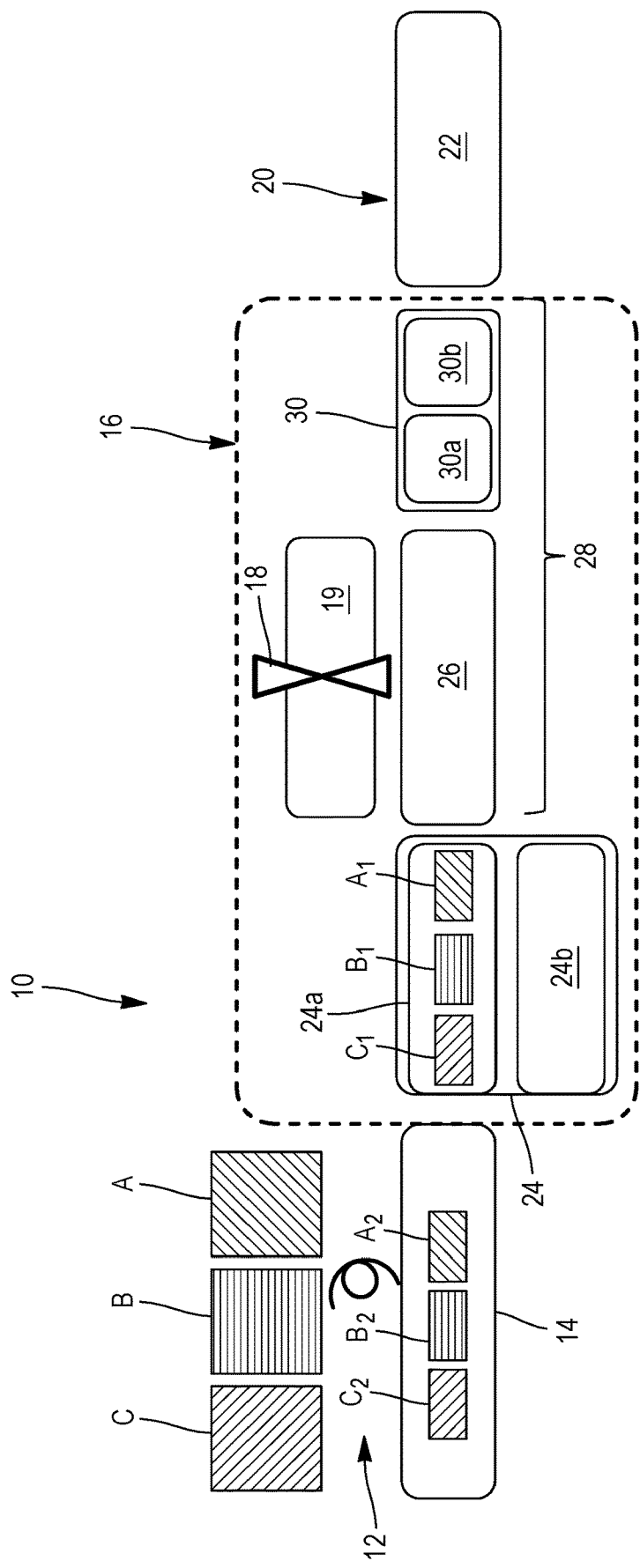
FIGS. 2 to 15 show the system of FIG. 1 in the course of a dosing sequence during a batch creation cycle.
Figure 3:
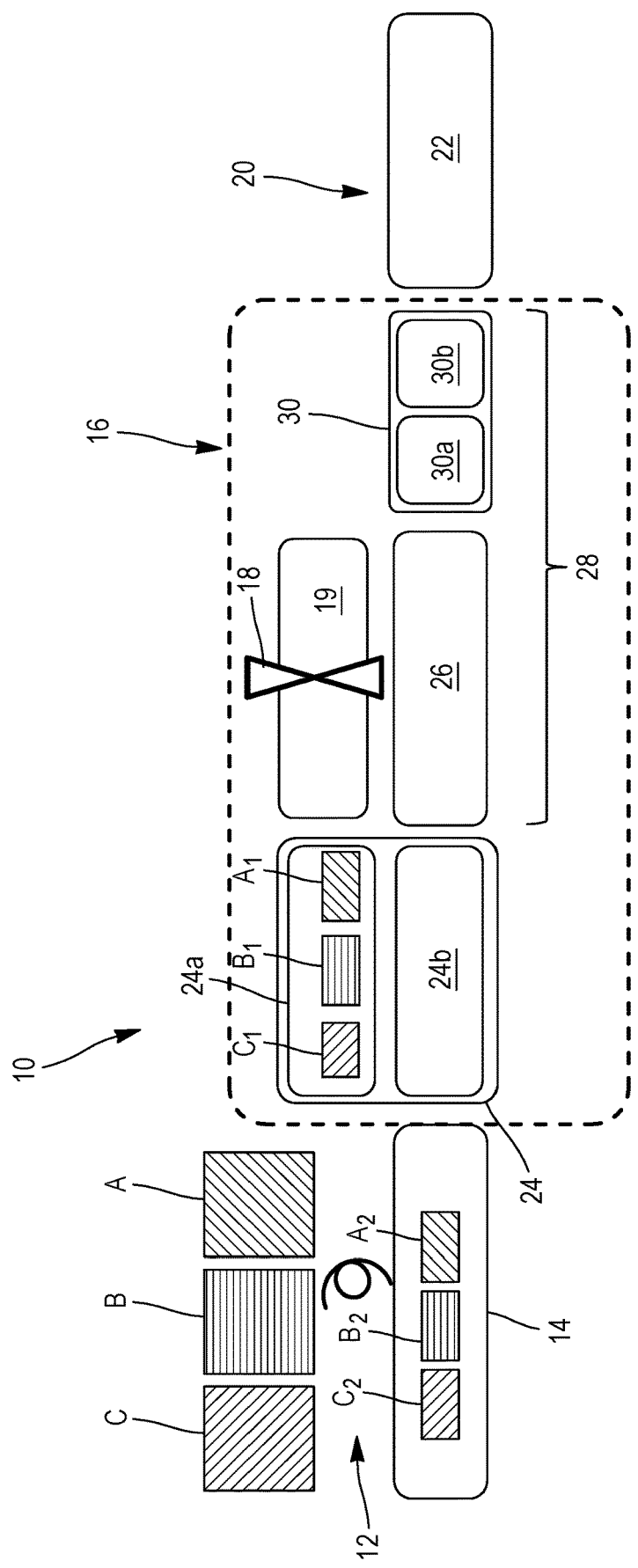
Figure 4:
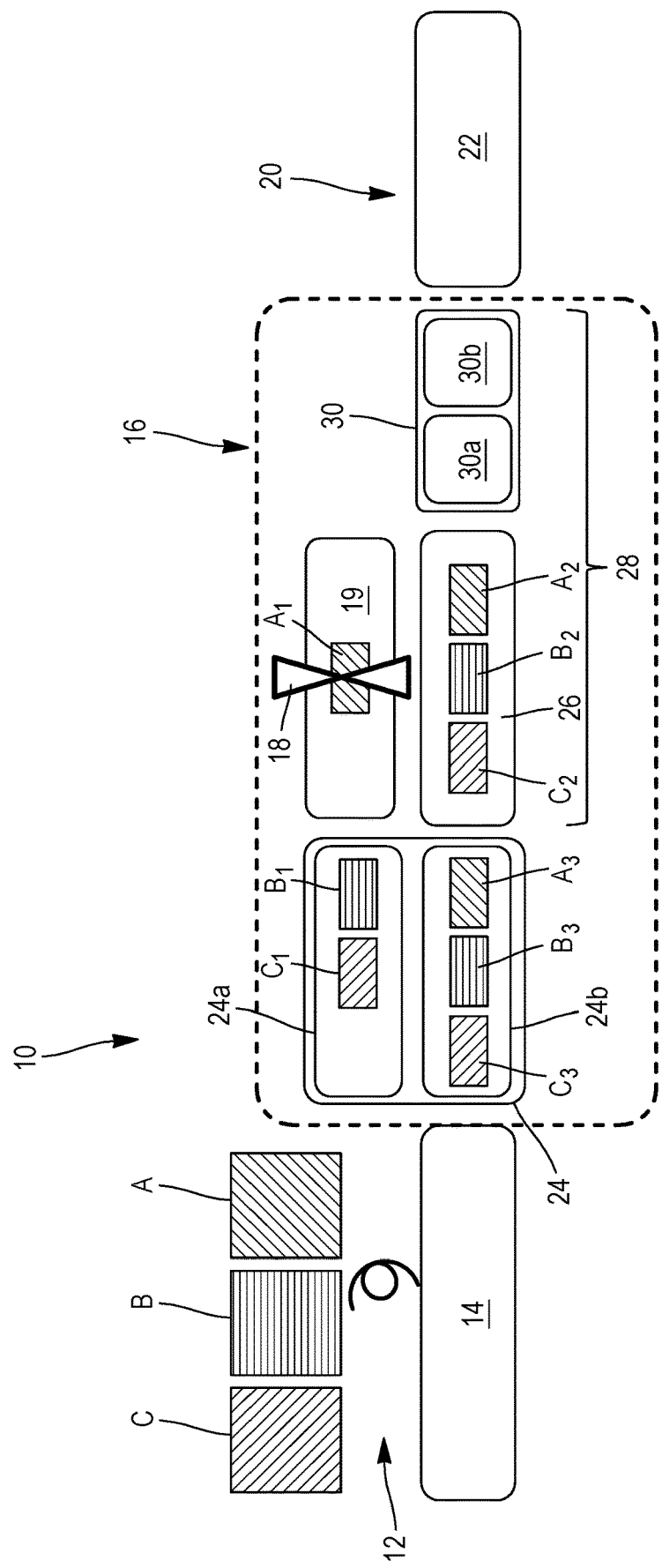
Figure 5:
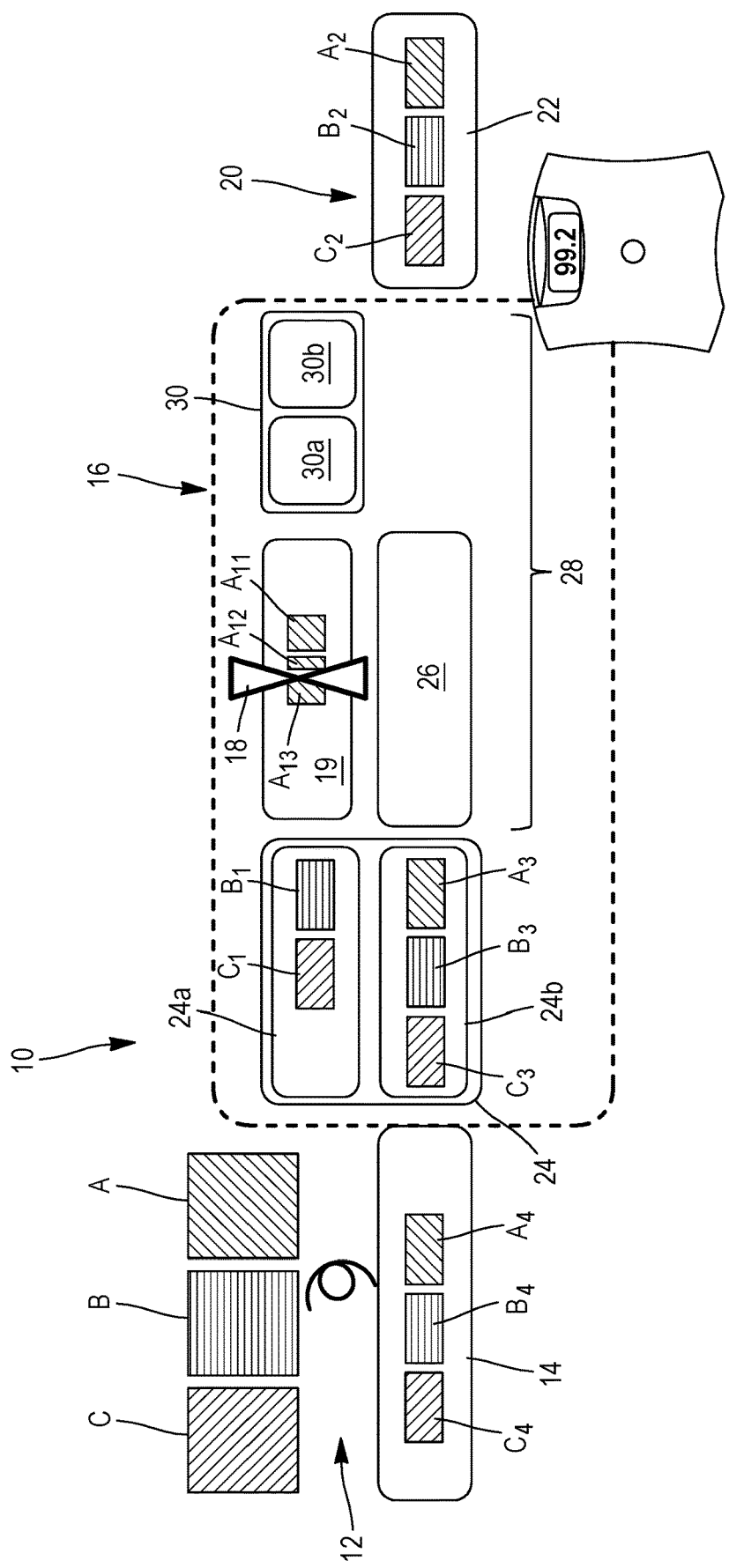

As can be seen in FIGS. 1 and 2, system 10 includes a supply station 12 where rubber bales $A_I$, $B_I$, $C_I$ (where "I" varies from 1 to N) are selected from among natures A, B, C and are placed on a feed belt 14. Supply station 12 may include a location for receiving and storing the bales before creating a batch. As shown and described, three bales are chosen from the three different natures to create a batch during a batch creation cycle. It is understood, however, that any number of bales may be selected in a batch creation cycle. It is also accepted (according to the foregoing description), and according to the requirements of the current recipe, that for the N bales chosen, different types and grades may be used but also bales of the same type and the same grade but from a different supplier or lot.

Referring again to FIG. 1, a cutting station 16 is provided that includes at least one cutting blade 18 for cutting at least one bale into pieces of predetermined weight. Blade 18 may include one or more blades that are disposed on a known machine for cutting the bale-shaped rubber. These machines are suitable for managing all natural rubber and synthetic rubber, including those that are pre-packaged at specific weights (e.g., 33.3 kg bale). At least one conveyor belt 19 carries the bales and pieces to feed blade 18 and to convey the pieces for the creation of the batch.

System 10 also has a weighing station 20 including at least one scale for weighing the bales $A_I$, $B_I$, $C_I$ and the pieces removed therefrom. In the process, weighing is done before delivery of the batch to a rubber mixer. In order to feed weighing station 20, a conveyor belt 22 is provided having at least one scale as is known in the art. Although only one conveyor belt 22 is shown, several conveyor belts may be used in accordance with the number and types of batch being created.

A distribution shuttle 24 is arranged between supply station 12 and cutting station 16 to transport the bales $A_I$, $B_I$, $C_I$. Distribution shuttle 24 includes at least two delivery belts 24a, 24b that make it possible to transfer bales $A_I$, $B_I$, $C_I$ from feed belt 14 to blade 18 or to weighing station 20. Distribution shuttle 24 alternates between a position in which delivery belt 24a receives the bales from feed belt 14 (see FIG. 2) and a position in which delivery belt 24a conveys the bales to blade 18 (see FIG. 3). In this latter position, delivery belt 24b receives additional bales A', B', C' for direct transfer to weighing station 20 by a transfer belt 26, thereby bypassing blade 18 (see FIGS. 4 and 5). The transport sequence is determined by the equivalence between the required weight of the batch and (a) the detected weight of the bales or (b) a sum of the detected weight of the bales and a detected weight of the pieces.

System 10 also includes a storage station 28 that includes transfer belt 26 and a transport shuttle 30 between the transfer belt and weighing station 20. Transport shuttle 30 includes at least two belts 30a, 30b that transport the pieces of bales $A_I$, $B_I$, $C_I$ (which are cut by blade 18) selectively between the cutting station and at least one of storage station 28 and weighing station 20. In one position, transport shuttle 30 is disposed in the vicinity of transfer belt 26 so that belts 30a, 30b receive bales $A_2$, $B_2$, $C_2$ (see FIG. 4) and convey these bales directly to weighing station 20 (see FIG. 5). In another position, transport shuttle 30 is disposed close to conveyor belt 19 so that at least one belt 30a or 30b receives the pieces that are cut from bales $A_I$, $B_I$, $C_I$ by blade 18 (See FIG. 6).

Figure 7:
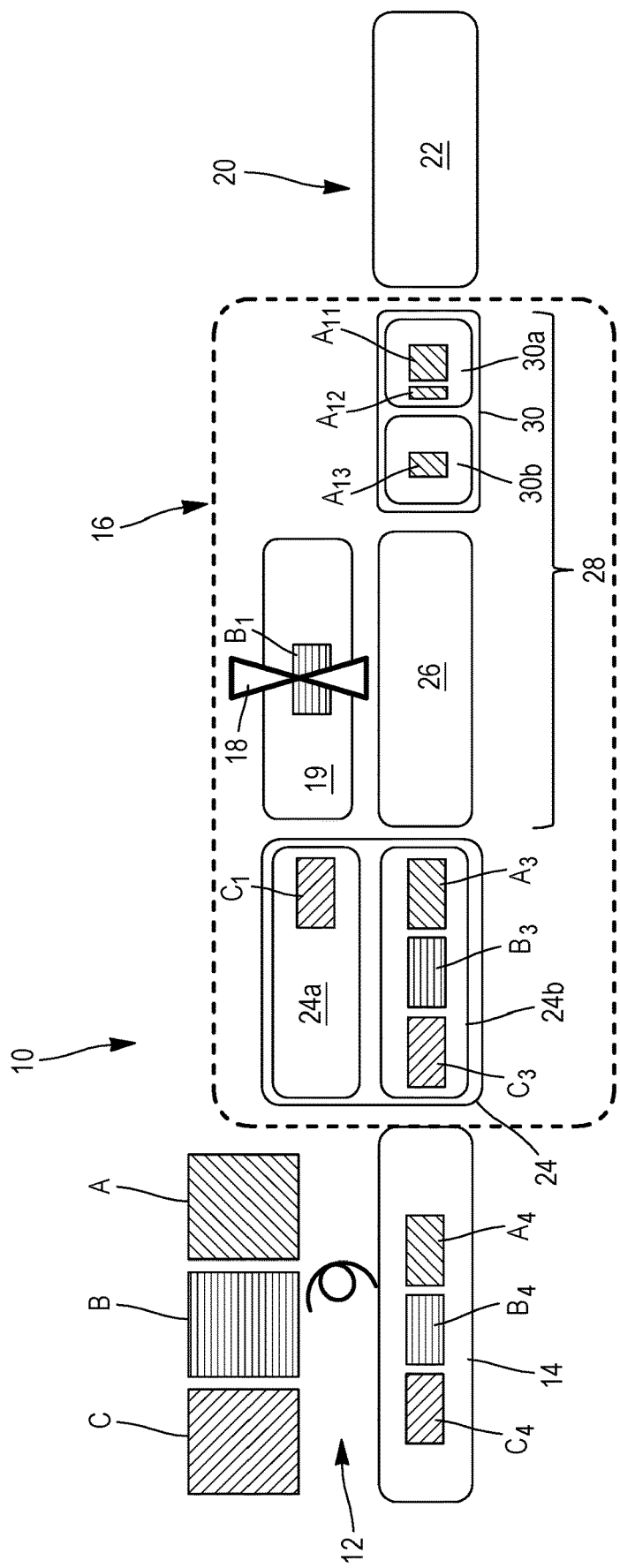
Figure 8:
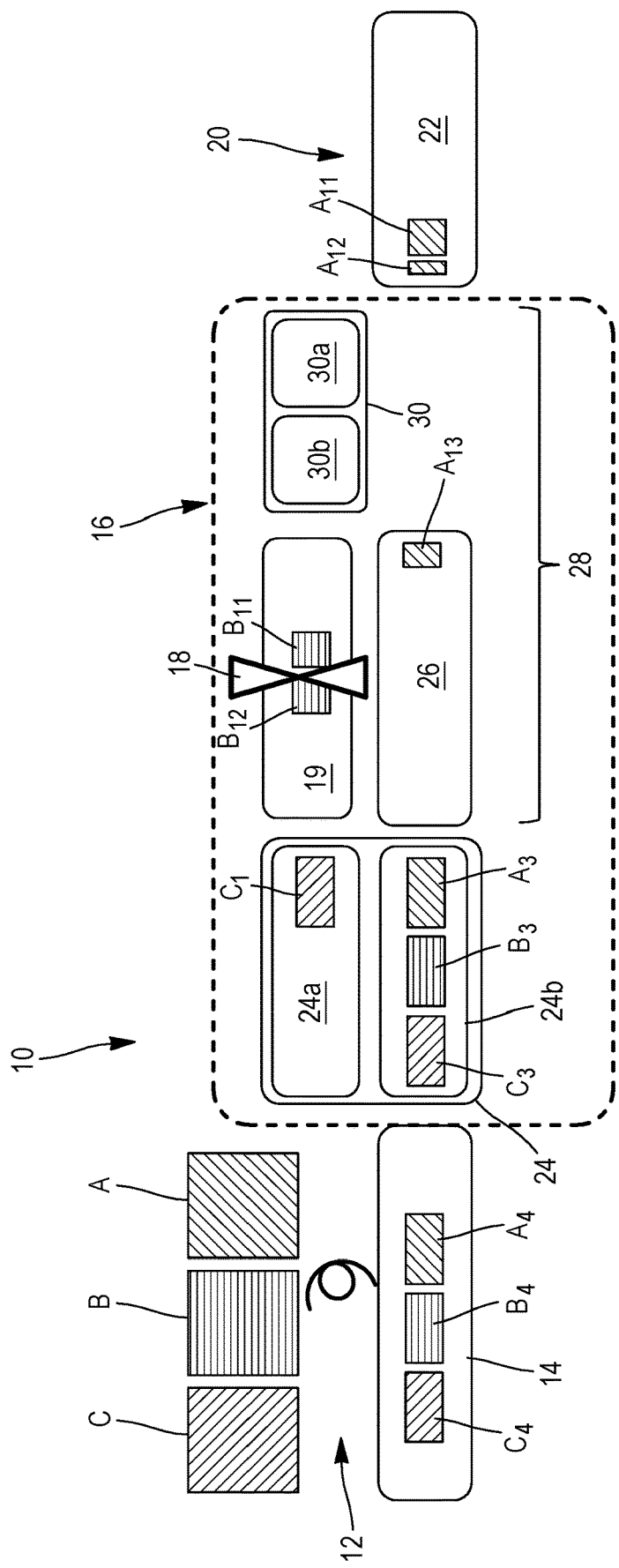

In a further position, transport shuttle 30 is arranged such that belt 30a delivers certain pieces to conveyor belt 22 and belt 30b delivers the remainder of the pieces to transfer belt 26 (see FIGS. 7 and 8). Transfer belt 26 stores the pieces until commencement of the next batch creation cycle. The transport and storage sequence is determined by the equivalence between the required weight of the batch and a sum of the detected weight of the bales and the detected weight of the pieces. It is understood that any number of pieces $A_{I,J}$, $B_{I,J}$, $C_{I,J}$ (where "J" varies from 1 to N) can be cut to create a batch with the required weight.

Reference is now made to the figures to describe a dosage process that is performed by system 10. As used herein, a "batch" refers to an amount required for a batch creation cycle and may include one or several types of rubber for mixing. For a selected mixture, several types of elastomers are supplied according to the recipe. Doses are usually delivered in kilograms at a specified frequency (e.g., about 3 minutes). In this example, three natures are used in a batch, and for the same type and grade, the distribution may be between 20% and 45% of the required weight of that type and grade. In a given cycle time, the weight of the different natures is checked, as is the weight of the batch according to the specifications of the recipe. In some embodiments, the cycle time is less than or equal to 250 cm. All figures are provided by way of example only and do not limit the invention to particular values.

In FIG. 1, a dosing process begins. A batch is selected that requires the mixing of three different types of rubber. For example, the selected batch has a required weight of 150 kg, however, it is understood that the required weight can be any weight.

At the supply station 12, three bales $A_I$, $B_I$, $C_I$ are chosen from the corresponding rubber natures A, B, C. Each bale $A_I$, $B_I$, $C_I$ has a predetermined weight close to 33 kg. The use of bales whose weight is approximately known avoids the time to weigh the individual bales. Thus, while the final batch must include, for example, three natures in a batch, for the same type and the same grade, the distribution may be between 20% and 45% of the required weight of that grade and type.

Bales $A_I$, $B_I$, $C_I$ are supplied to feed belt 14 by an operator (as shown) or automatically. The bales can be supplied in any order (ABC, ACB, BAC, BCA, CAB, CBA) in correspondence with the selected batch. A system can be set up to ensure the reproducibility of the location and position of each bale. The accuracy of the cutting and weighing during each batch creation cycle is thus respected. It is desirable to cut a larger piece of bale than expected. In this way, the excess weight of the batch can be stored at storage station 28 before delivery to the rubber mixer. This surplus will be used for the next batch.

Referring further to FIGS. 2 to 5, feed belt 14 conveys bales $A_I$, $B_I$, $C_I$ to delivery belt 24a. Feed belt 14 is loaded with a second set of bales $A_2$, $B_2$, $C_2$, and distribution shuttle 24 aligns delivery belt 24a with conveyor belt 19. Delivery belt 24b readily receives bales $A_2$, $B_2$, $C_2$ and transfers them directly to transfer belt 26. Transport shuttle 30 is positioned downstream of transfer belt 26. Transport shuttle 30 transports bales $A_2$, $B_2$, $C_2$ to weighing station 20 and conveying belt 22. Delivery belt 24b simultaneously receives a third set of bales $A_3$, $B_3$, $C_3$ as feed belt 14 is loaded with a fourth set of bales $A_4$, $B_4$, $C_4$ (up until a set of bales $A_I$, $B_I$, $C_I$).

Figure 6:
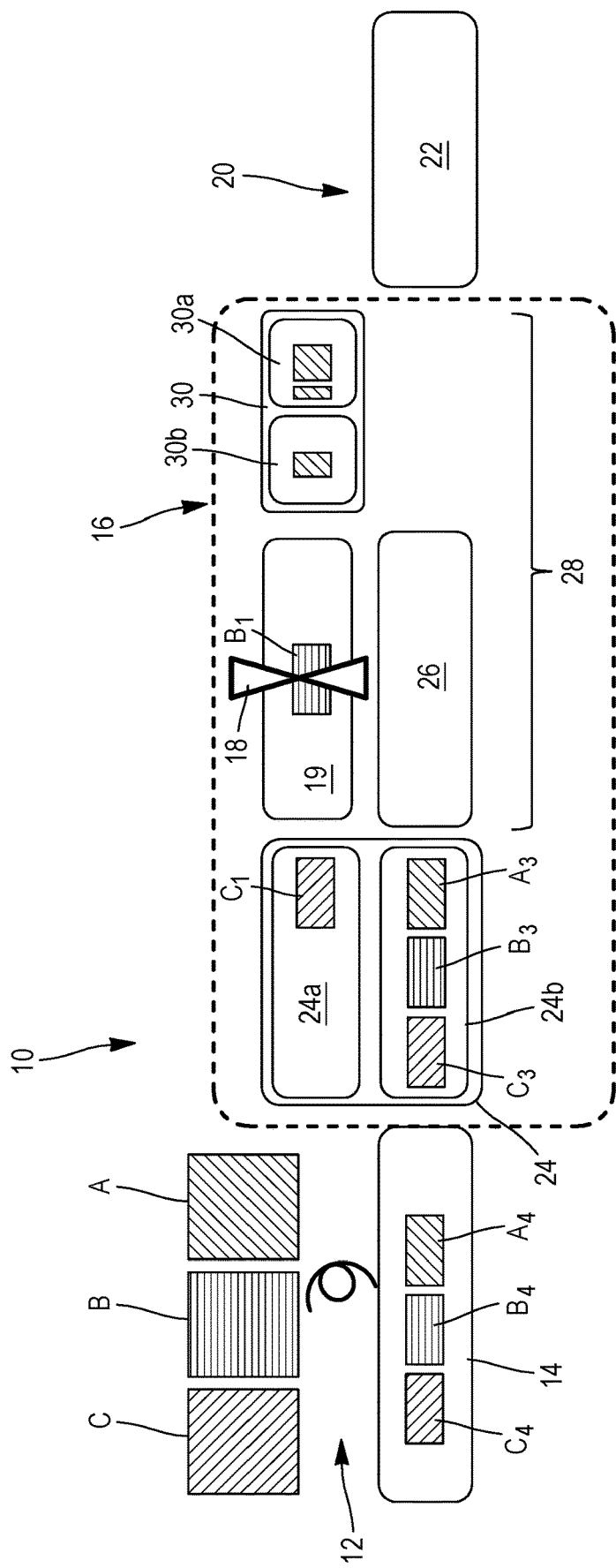

Referring again to FIG. 5 and further referring to FIGS. 6 to 8, weighing station 20 detects the cumulative weight of bales $A_2$, $B_2$, $C_2$ and compares a detected weight of the batch with the required weight of the batch (i.e., 150 kg). Since the cumulative weight of the bales is about 99.2 kg, which is less than the required weight of the batch, the difference (about 50.8 kg) must be obtained in the same proportion. After weighing, conveyor belt 22 carries bales $A_2$, $B_2$, $C_2$ to an area where the bales are stored until the desired batch weight is obtained. A control belt (not shown) can be disposed downstream of weighing station 20. The control belt not only verifies the weight of the batches (these include bales and pieces of bales) before delivery to the rubber mixer, but also allows storage of pieces until a full batch is created.

To obtain the difference, delivery belt 24a transfers bale $A_1$ to conveyor belt 19 in order to feed the bale to cutting blade 18 and to transport the pieces to weighing station 20. Bale $A_1$ advances under blade 18 that cuts the bale successively into one or more pieces $A_{11}$, $A_{12}$, $A_{13}$. Conveyor belt 19 conveys pieces $A_{11}$, $A_{12}$, $A_{13}$ to transport shuttle 30 and distributes the pieces between delivery belts 30a, 30b. The number of pieces on each delivery belt depends on the cumulative weight of pieces $A_{11}$, $A_{12}$, $A_{13}$ and the weight difference between the detected weight of bales $A_2$, $B_2$, $C_2$ and the required weight of the batch.

Delivery belt 30a carries pieces $A_{11}$, $A_{12}$, $A_{13}$ to weighing station 20 at the same time that delivery belt 30b carries piece $A_{13}$ to transfer belt 26. Transfer belt 26 stores piece $A_{13}$ until the arrival of pieces $B_1$, $C_1$ that follow.

Figure 9:
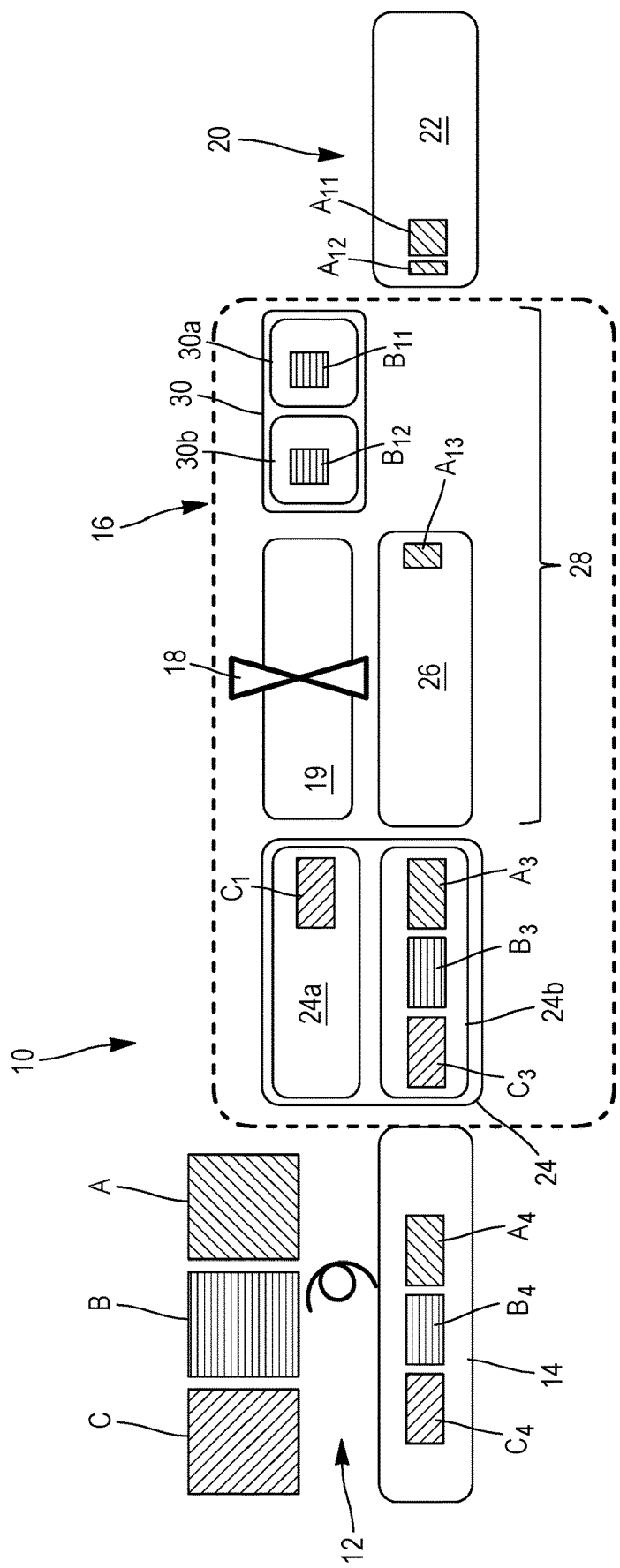
Figure 10:
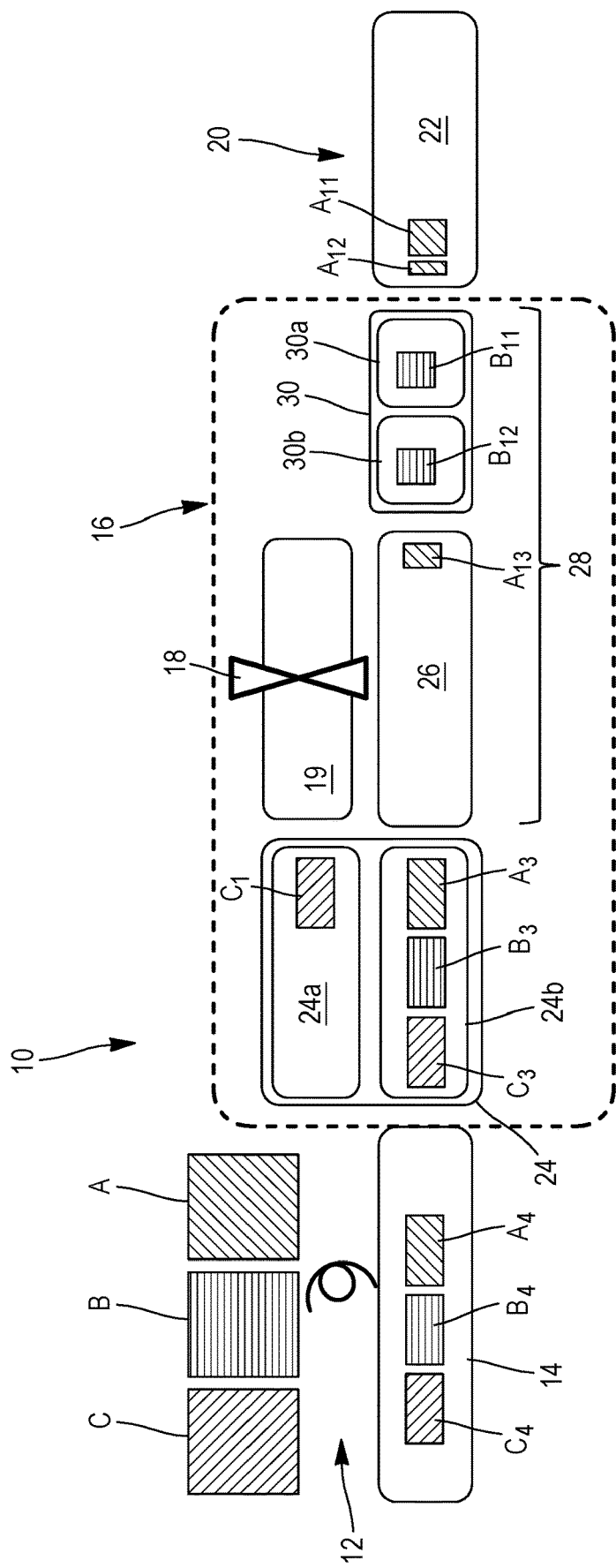

Referring again to FIG. 8 and further referring to FIGS. 9 and 10, transport shuttle 30 aligns delivery belt 30b with conveyor belt 19 while blade 18 cuts bale $B_1$ into pieces $B_{11}$, $B_{12}$. Belt 30b receives pieces $B_{11}$, $B_{12}$ and conveys piece $B_{11}$ to belt 30a. Transport shuttle 30 aligns delivery belt 30a with conveyor belt 22 to deliver piece $B_{11}$ to weighing station 20. Transport shuttle 30 simultaneously aligns delivery belt 30b with transfer belt 26 to deliver piece $B_{12}$. Transfer belt 26 stores piece $B_{12}$ until the subsequent arrival of the pieces of the bale $C_1$.

Figure 11:
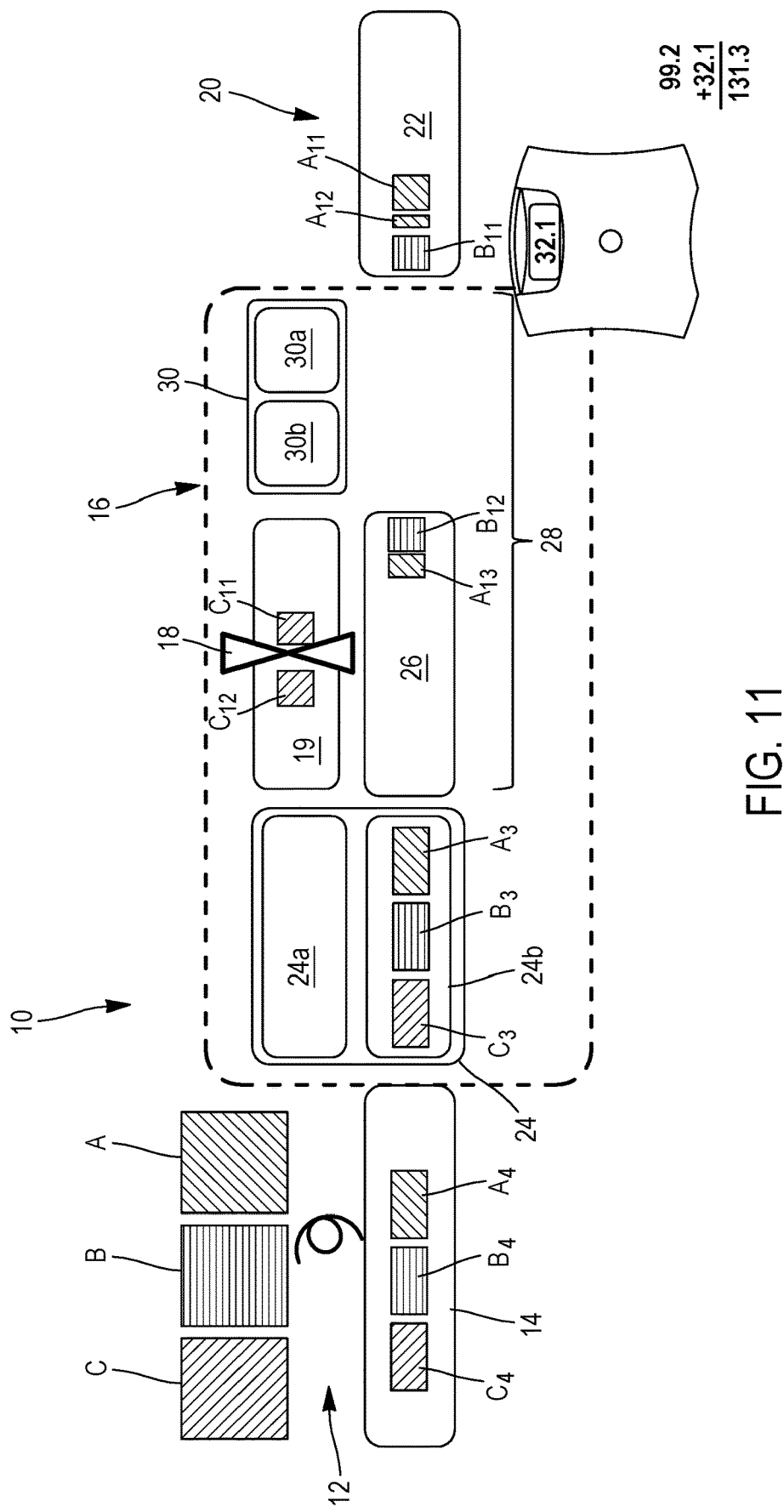

Referring further to FIG. 11, weighing station 20 detects the cumulative weight of pieces $A_{11}$, $A_{12}$ and $B_{11}$ at about 32.1 kg. Weighing station 20 may include a comparator that receives the sum of the detected weight of bales $A_1$, $B_1$, $C_1$ and a detected weight of pieces $A_{11}$, $A_{12}$ and $B_{11}$. This sum (131.3 kg) is then compared with the required weight of the batch (i.e., 150 kg). If the required weight of the batch exceeds this sum, the difference is obtained with the bale $C_1$.

Figure 12:
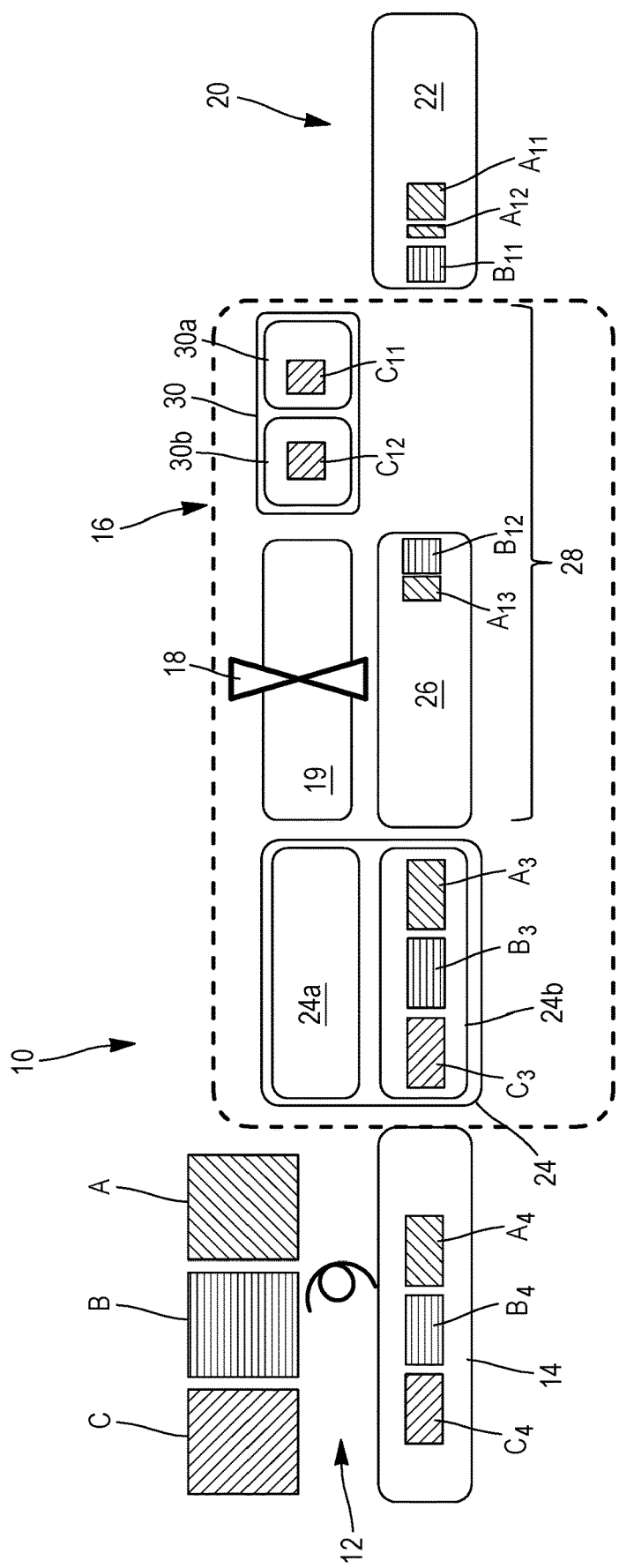

Referring again to FIG. 11 and further referring to FIG. 12, at cutting station 16, blade 18 cuts bale $C_1$ into pieces $C_{11}$, $C_{12}$. Conveyor belt 19 transports these pieces to transport shuttle 30. Delivery belt 30b receives pieces $C_{11}$, $C_{12}$ and conveys piece $C_{11}$ to delivery belt 30a. Transport shuttle 30 aligns belt 30a with conveyor belt 22 to deliver piece $C_{11}$ to weighing station 20. Transport shuttle 30 at the same time aligns belt 30b and transfer belt 26. Belt 30b stores piece $C_{IJ}$ with pieces $A_{13}$, $B_{12}$ until creation of the next batch.

Figure 13:
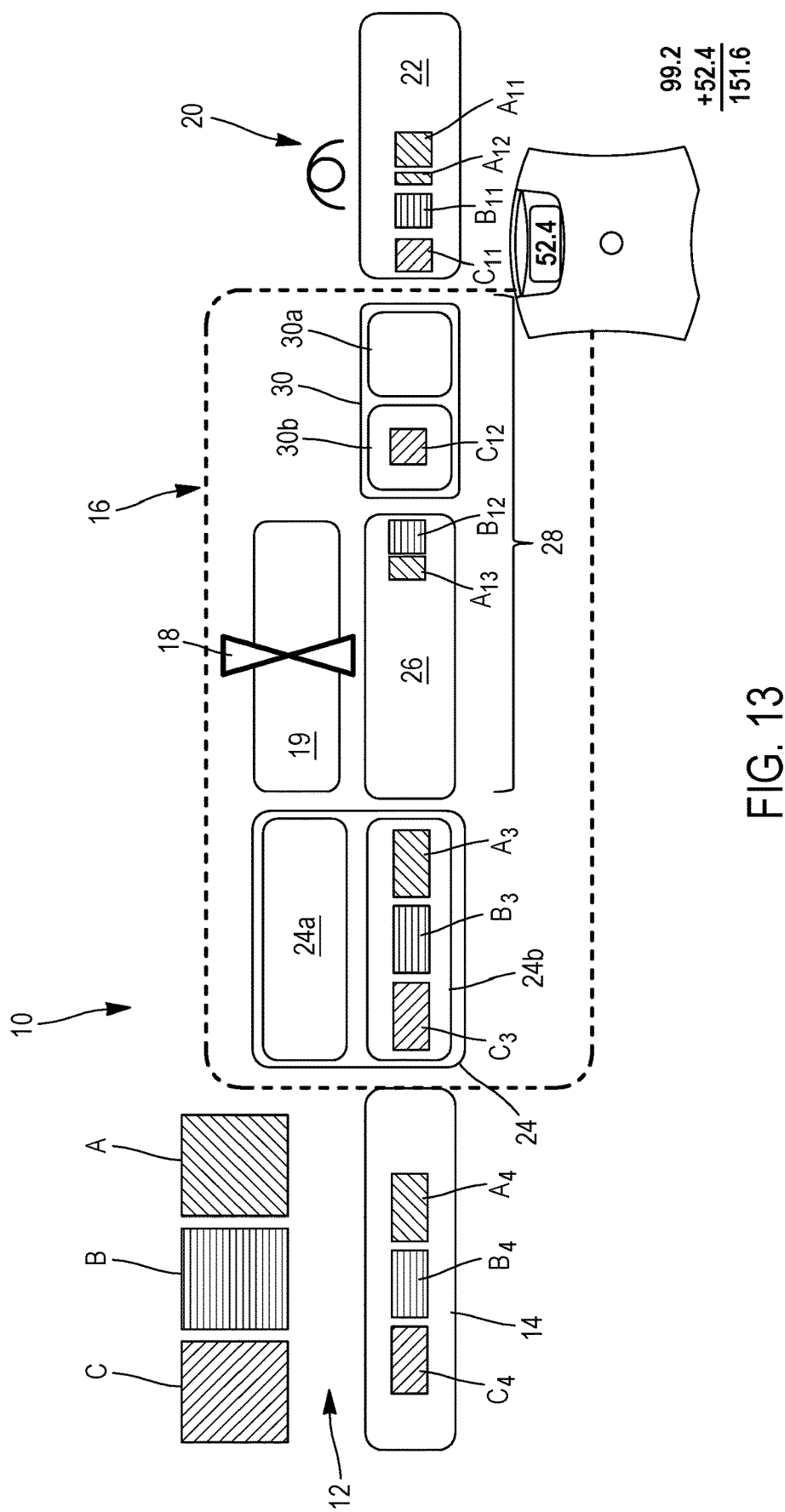
Figure 14:
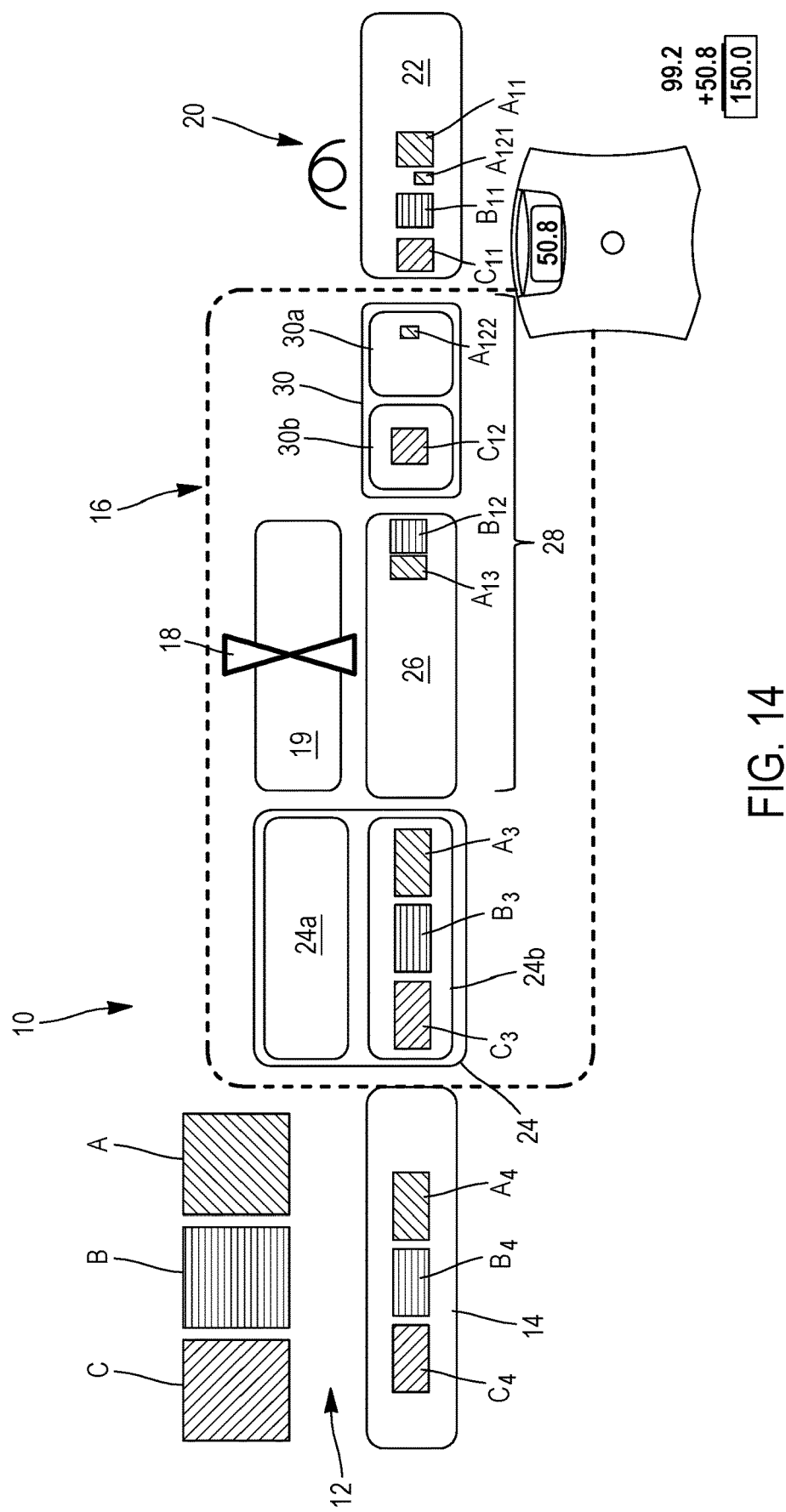
Figure 15:
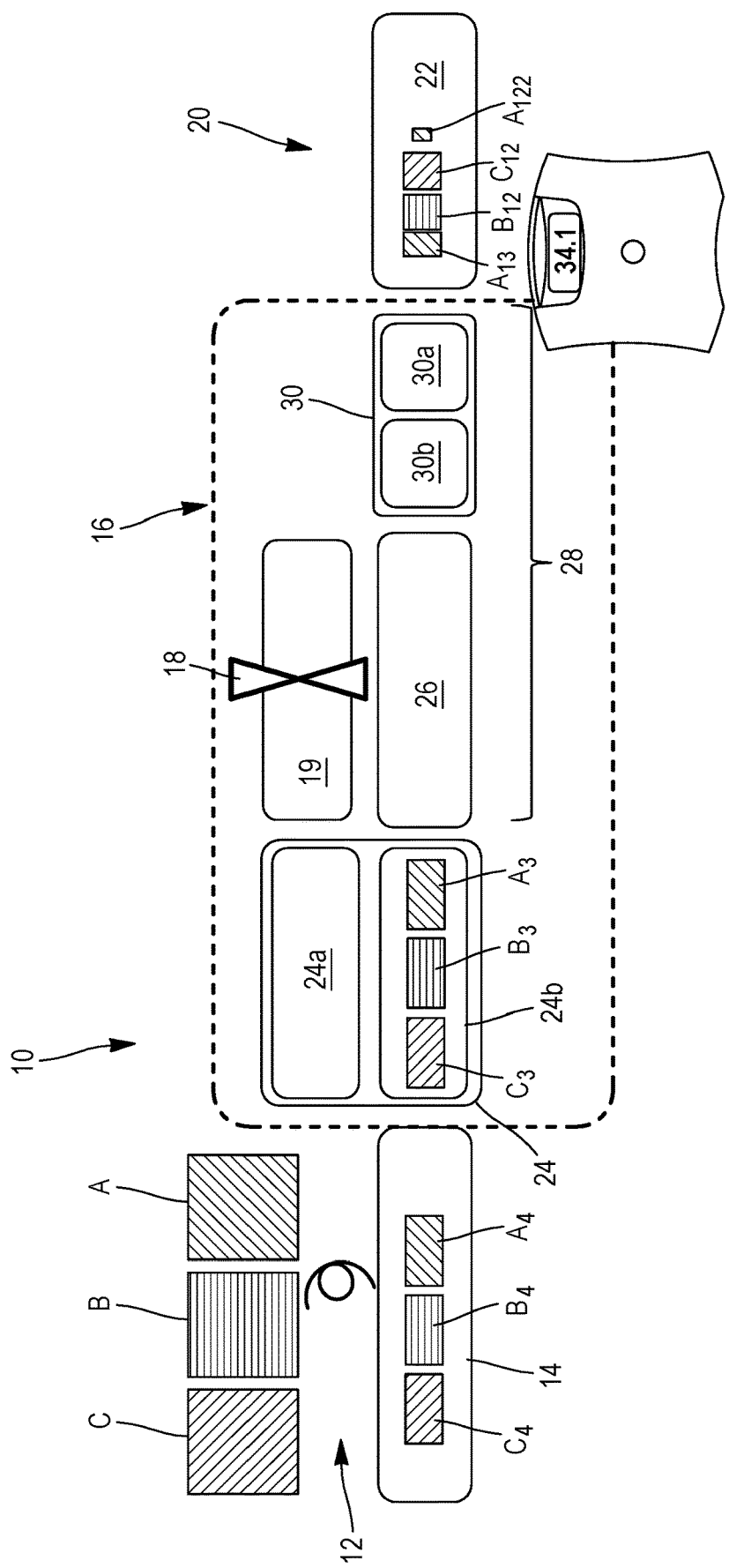

Referring further to FIGS. 13 and 14, weighing station 20 detects the cumulative weight of pieces $A_{11}$, $A_{IJ}$, $B_{11}$ and $C_{IJ}$ at about 52.4 kg. Thus, the sum of the detected weight of the bales $A_2$, $B_2$, $C_2$ and a detected weight of the bale pieces $A_{11}$, $A_{IJ}$, $B_{11}$ and $C_{11}$ is obtained and compared with the required batch weight (i.e., 150 kg). In this example, the sum of the detected weights is about 151.6 kg, which is greater than the required weight of the batch.

At weighing station 20 or at the control station, excess weight is eliminated by cutting a small piece from one of the pieces $A_{11}$, $A_{12}$, $B_{11}$, $C_{11}$. Thus, piece $A_{IJ}$ is divided into two pieces $A_{121}$, $A_{122}$, in which the piece $A_{122}$ is cut precisely to weigh about 1.6 kg. The cut of piece $A_{122}$ is done manually or automatically. Piece $A_{122}$ is transferred to belt 30a to be stored until a subsequent batch creation cycle. The sum of the detected weights then becomes 150 kg, which is equal to the required weight of the batch. The pieces $A_{11}$, $A_{12}$, $A_{121}$, $B_{11}$, $C_{11}$ are assembled with the bales $A_2$, $B_2$, $C_2$, ensuring both a correct batch weight and an appropriate weight proportion of each rubber type before entering the mixer.

Although weighing is shown to be carried out at weighing station 20, cutting bales of one rubber type can take place at the same time as weighing bales or pieces of another rubber type. It is also contemplated that the weighing steps may be performed during the cycle before weighing station 20. For example, a scale can detect the weight of bales before cutting them. Another scale can detect the weight of the pieces after cutting and before transporting the pieces to weighing station 20.

A blade cycle can be effected by PLC control and may include pre-programmed cutting information (e.g., a nominal cut thickness to achieve a required weight, a total number of cuts required when presented with a certain number of natures, or a residence time before the next cut). To perform an automatic cut, several sensors can detect not only the presence or absence of one of the bales A, B, C, but also the precise positioning of each bale before passing under blade 18.

Figure 16:
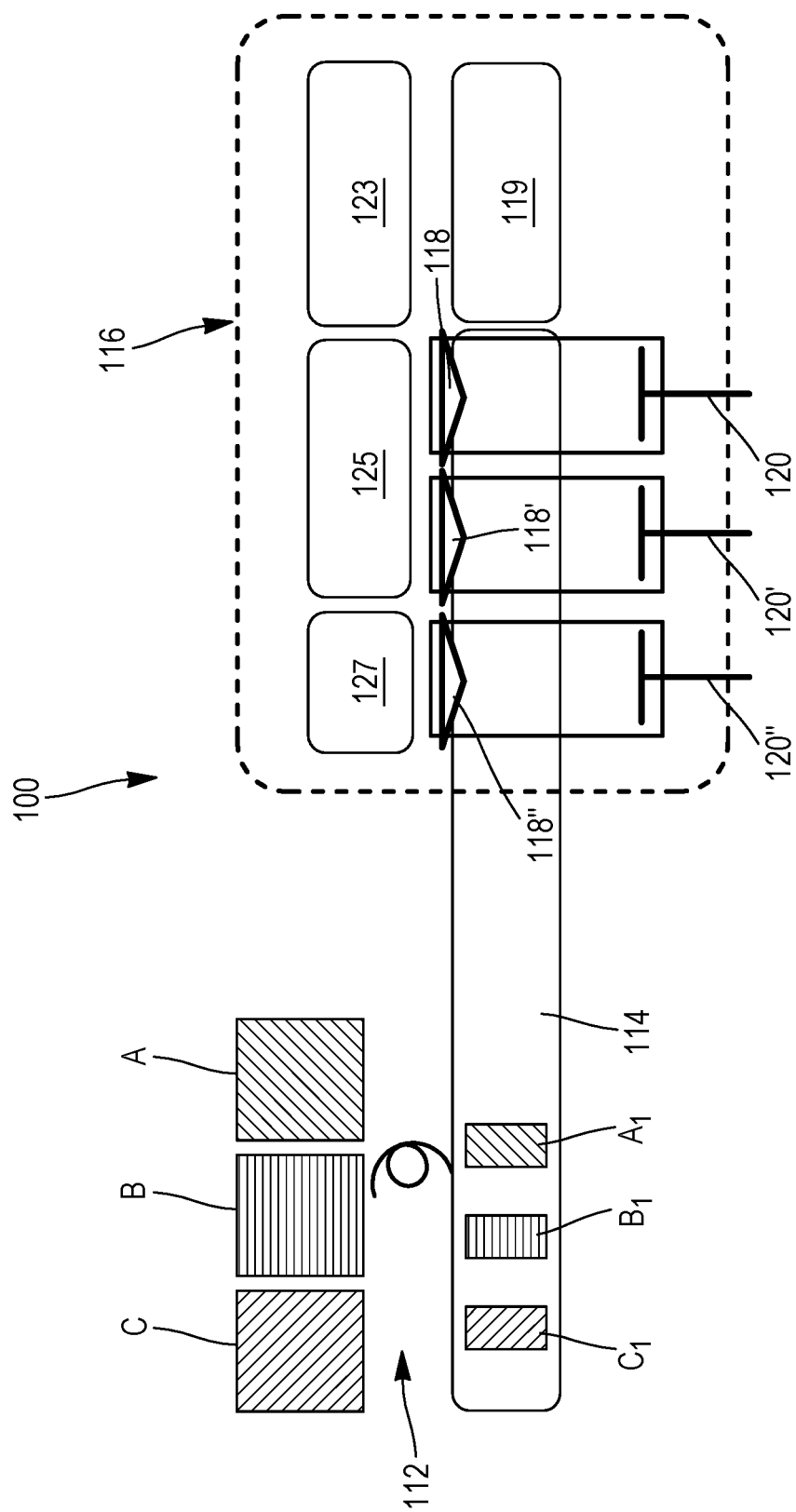
FIG. 16 is a schematic view of another embodiment of a system for cutting rubber according to the invention.

FIGS. 16 to 19 show another embodiment of the invention for creating batches of rubber to be mixed. As shown in FIG. 16, a system 100 includes a supply station 112 where rubber bales $A_I$, $B_I$, $C_I$ (where "I" varies from 1 to N) are selected from rubber species A, B, C and are placed on a feed belt 114. Supply station 112 may include a slot for receiving and storing the bales before creating a batch. As described with reference to FIGS. 1 to 15, batches are created by mixing different types and grades of elastomers. For example, as described with reference to FIGS. 1-15, to create a batch during a batch creation cycle, any number of bales of natural rubber and synthetic rubber may be selected in a batch creation cycle. The rubber bales $A_I$, $B_I$, $C_I$ may be different from the rubber bales A, B, C selected with reference to system 10. Rubber bales $A_I$, $B_I$, $C_I$ include bales that are pre-packaged at specific weights.

Referring again to FIG. 16, feed belt 114 feeds a cutting station 116 having at least three cutting subassemblies 118, 118' and 118". Each subassembly cuts at least one bale into pieces of predetermined weight, and each subassembly may include one or more blades that are disposed on a known machine for cutting the bale-shaped rubber. It is understood that any number of pieces $A_{IJ}$, $B_{IJ}$, $C_{IJ}$ (where "J" varies from 1 to N) are cut in order to create a batch with the required weight. Each subassembly 118, 118', 118" is coupled with a respective linear actuator 120, 120', 120" that adjusts the position of a bale according to the needs of the rubber mixture recipe. Each linear actuator operates as known (for example, pneumatically or hydraulically).

System 100 also has a transport system that transfers the rubber bales and pieces. In this transport system, feed belt 114 feeds rubber to cutting subassemblies 118, 118', 118", and at least one conveyor belt 119 conveys rubber bales and pieces for feeding at least one mixer (not shown) for creation of the batch. Conveyor belt 119 includes at least one scale as is known in the art. The transport system also includes conveyor belts 123, 125 and 127 that convey the rubber pieces from cutting subassemblies 118, 118', 118" to feed the mixer. Each conveyor belt 125 and 127 includes at least one scale similar to that provided with conveyor belt 119. A control belt (not shown) can be disposed downstream of each conveyor belt 119 and 123. The control belt not only verifies the batch weight (which includes bales and pieces of bales) before delivery to the rubber mixer, but also allows storage of the pieces until a full batch is created. Although only one conveyor belt 119, 123, 125 or 127 is shown, several conveyor belts may be used in accordance with the number and types of batches being created.

Reference is now made to FIGS. 16 to 19 for describing a dosing process that is performed by system 100. All figures are provided by way of example only and do not limit the invention to particular values.

In FIG. 16, a dosing process begins. A batch is selected that requires the mixing of three different types of rubber. For example, the selected batch has a required weight of 150 kg, although it is understood that the required weight can be any weight.

At supply station 112, three bales $A_1$, $B_1$, $C_1$ are chosen from the corresponding rubber natures A, B, C. Each bale $A_1$, $B_1$, $C_1$ has a predetermined weight close to 30 kg. Bales $A_1$, $B_1$, $C_1$ are supplied to feed belt 114 by an operator (as shown) or automatically. The bales can be supplied in any order (ABC, ACB, BAC, BCA, CAB, CBA) in correspondence with the selected batch.

Figure 17:
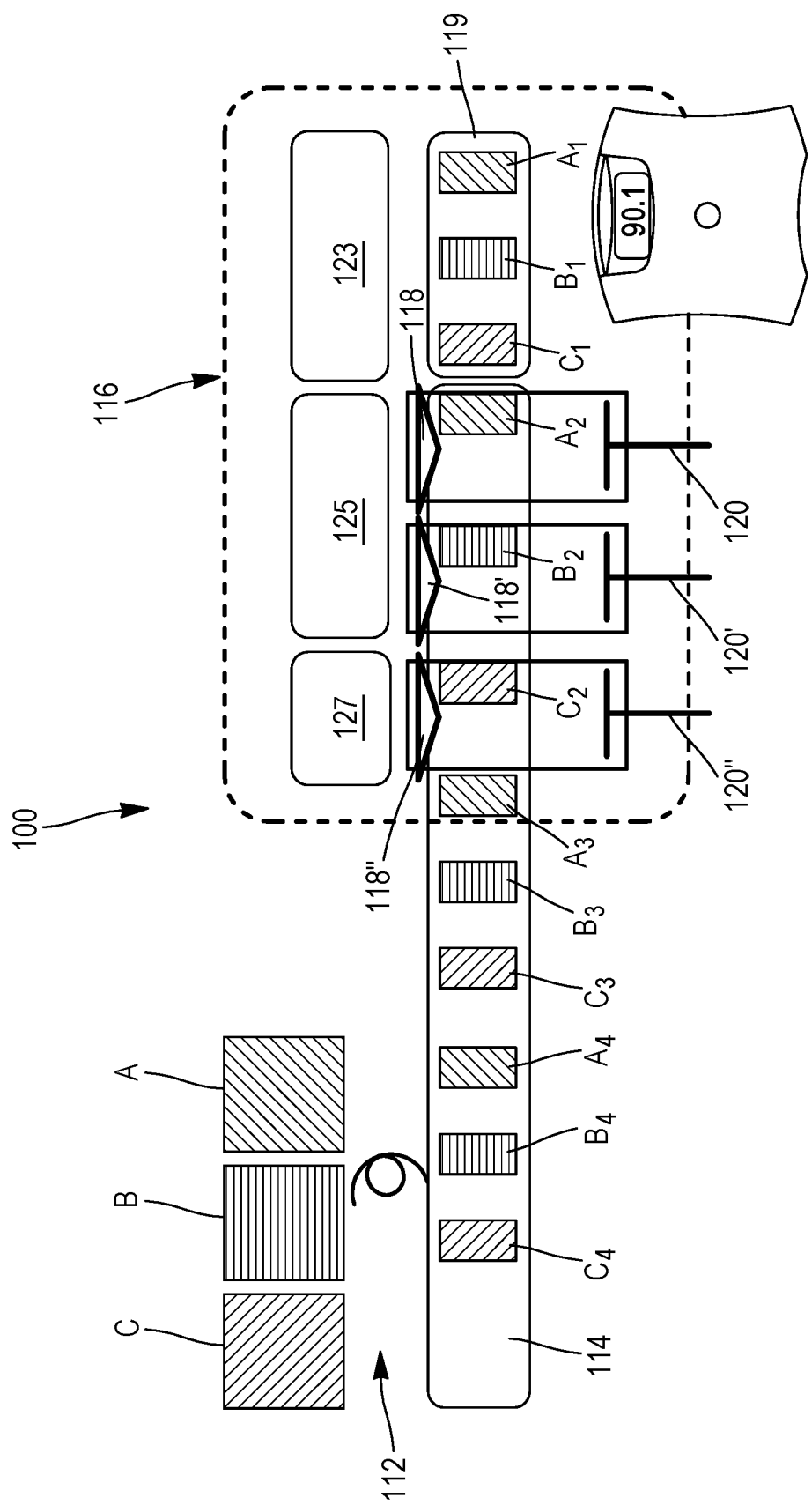
FIGS. 17 to 19 show the system of FIG. 16 in the course of a dosing sequence during a batch creation cycle.
Figure 18:
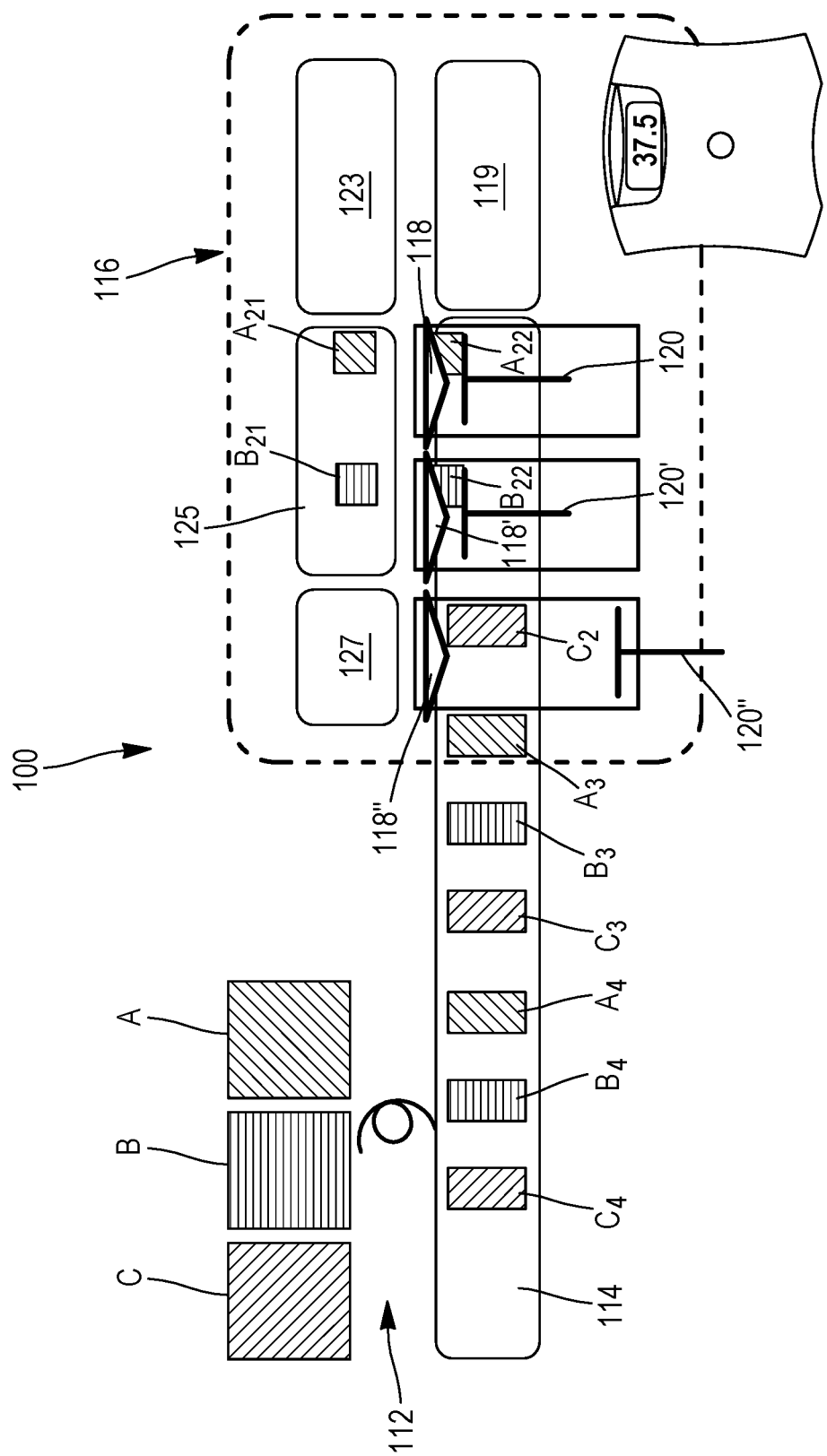
Figure 19:
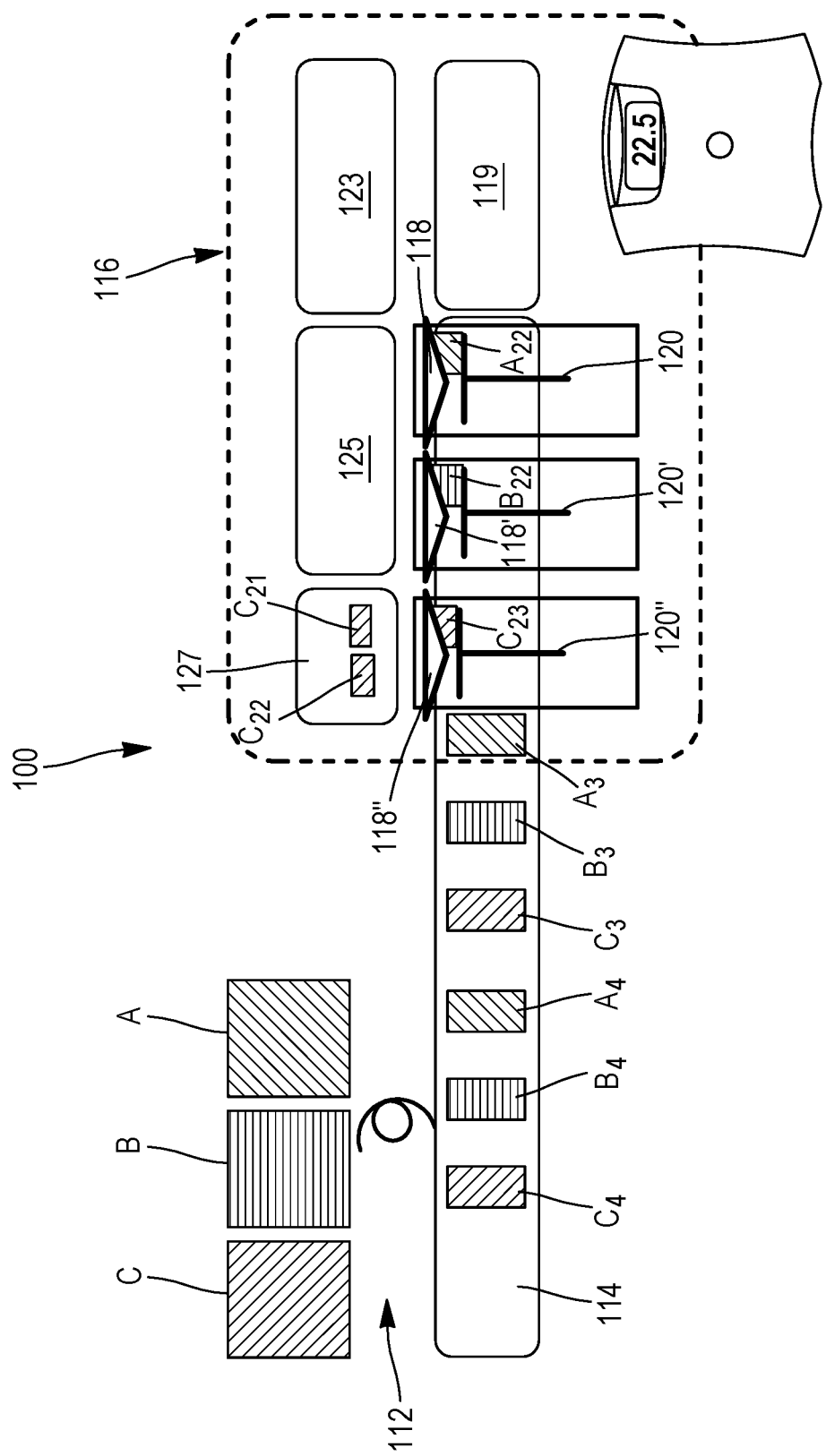

Referring further to FIGS. 17-19, feed belt 114 carries bales $A_1$, $B_1$, $C_1$ to conveyor belt 119 at the same time that feed belt 114 is loaded with a second set of bales $A_2$, $B_2$, $C_2$, a third set of bales $A_3$, $B_3$, $C_3$ and a fourth set of bales $A_4$, $B_4$, $C_4$. Conveyor belt 119 easily receives bales $A_1$, $B_1$, $C_1$ and detects the cumulative weight of bales $A_1$, $B_1$, $C_1$. System 100 compares a detected weight of the bales with the required weight of the batch (i.e., 150 kg). Since the cumulative weight of the bales is about 90.1 kg, which is less than the required weight of the batch, the difference (about 60 kg) must be obtained in the same proportion. After weighing, conveyor belt 119 conveys bales $A_1$, $B_1$, $C_1$ directly to the mixer or to an area where the bales are stored until the desired batch weight is obtained.

In order to obtain the difference, during the transfer of bales $A_1$, $B_1$, $C_1$ to conveyor belt 119, feed belt 114 transfers bales $A_2$, $B_2$, $C_2$ to respective cutting subassemblies 118, 118' and 118" in order to feed the blades (thus, bale $A_2$ is aligned with cutting subassembly 118, bale $B_2$ is aligned with cutting subassembly 118' and bale $C_2$ is aligned with cutting subassembly 118"). Referring again to FIG. 17 and further referring to FIGS. 18 and 19, bale $A_2$ will advance towards subassembly 118 that will successively cut one or more pieces A $A_{21}$, $A_{22}$. Bale $B_2$ will advance towards subassembly 118' that will successively cut one or more pieces $B_{21}$, $B_{22}$. Bale $C_2$ will advance towards subassembly 118" that will successively cut one or more pieces $C_{21}$, $C_{22}$, $C_{23}$. The number of pieces depends on the difference in weight between the detected weight of bales $A_1$, $B_1$, $C_1$ and the required weight of the batch.

Referring again to FIG. 18 and further referring to FIG. 19, linear actuator 120 loads conveyor belt 125 with piece $A_{21}$ and linear actuator 120' loads conveyor belt 125 with piece $B_{21}$. Conveyor belt 125 easily receives pieces $A_{21}$, $B_{21}$ and detects the cumulative weight of the pieces (about 37.5 kg). The system 100 may include a comparator that receives the sum of the detected weight of bales $A_1$, $B_1$, $C_1$ and a detected weight of pieces $A_{21}$ et $B_{21}$. This sum (127.6 kg) is then compared with the required weight of the batch (i.e., 150 kg). If the required weight of the batch exceeds this sum, the difference is obtained with the bale $C_1$. After weighing, conveyor belt 125 conveys the pieces directly to belt 123 for transfer to the rubber mixer or for storage until the desired weight of the batch is obtained.

Referring again to FIG. 19, at cutting station 116, subassembly 118" cuts bale $C_2$ into pieces $C_{21}$, $C_{22}$, $C_{23}$. Linear actuator 120" loads conveyor belt 127 with pieces $C_{21}$, $C_{22}$. The conveyor belt easily receives pieces $C_{21}$, $C_{22}$ and detects the cumulative weight of the pieces (about 22.5 kg). System 100 detects the cumulative weight of pieces $A_{21}$, $B_{21}$, $C_{21}$ and $C_{22}$ at about 150.1 kg. Thus, the sum of the detected weight of bales $A_I$, $B_I$, $C_I$ and a detected weight of pieces $A_{21}$, $B_{21}$, $C_{21}$ and $C_{22}$ is obtained and compared with the required weight of the batch (i.e., 150 kg). In this example, the sum of the detected weights is approximately 150.1 kg, which is greater than the required weight of the batch.

At cutting station 116, the excess weight is eliminated by cutting a small piece of one of the pieces $C_{21}$, $C_{22}$ (i.e., a piece $C_{21}$ or $C_{22}$ is cut precisely to weigh about 0.1 kg). The cutting of the piece is done manually or automatically and the pieces $C_{21}$, $C_{22}$ are transferred to the belts 127, 125 and 123 for delivery to the mixer with bales $A_1$, $B_1$, $C_1$ and pieces $A_{21}$, $B_{21}$. Pieces $A_{22}$, $B_{22}$, $C_{23}$ are stored to ensure, during the next cycle, both a correct batch weight and an appropriate weight proportion of each rubber type prior to entry into the mixer.

A cycle of the cutting subassembly may be performed by PLC control and may include pre-programming of the cutting information (e.g., a nominal cut thickness to achieve a required weight, a total number of cuts required when presented with a certain number of natures, or a residence time before the next cut). In order to perform an automatic cut, several sensors can detect not only the presence or absence of one of the bales A, B, C, but also the precise positioning of each bale before passing under the cutting subassemblies.

Referring further to FIGS. 20-24B, an embodiment is shown that attains the required batch weight, in a proportion corresponding to the predetermined proportion, when a sum of the weight of the bales ($A_I$, $B_I$, $C_I$) and the weight of the pieces ($A_U$, $B_U$, $C_U$) is less than the required batch weight. This embodiment includes a step for determining a cutting length and a cutting position of a reference rubber bale R that are required to obtain the required weight of the batch. This embodiment also includes the step of cutting the reference rubber bale R at the specified cutting length and the specified cutting position as a function of the weight of the reference rubber bale R. This embodiment is usable by the two systems 10, 100.

Figure 20:
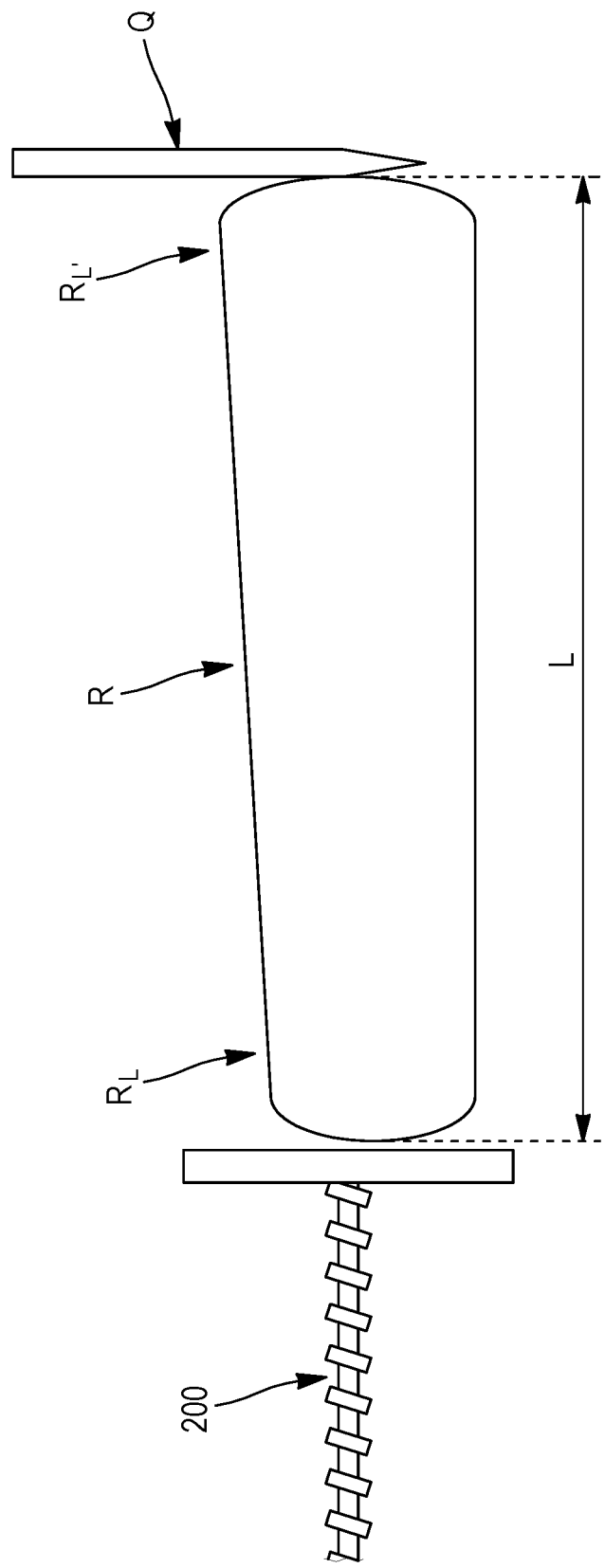

Referring to FIG. 20, a reference rubber bale R is provided of a predetermined rubber nature (A, B or C) and a predetermined proportion that correspond to a selected batch at the bale supply station 12 or 112. The reference rubber bale R is chosen to attain the required weight of the batch in a proportion corresponding to the predetermined proportion. The reference rubber bale R is provided with a predefined weight and a predefined length L between an end $R_L$ and an opposite end $R_{L'}$.

To determine a cutting length and a cutting position to obtain the required weight of the batch, a linear actuator 200 contacts the end $R_L$ to adjust the position of the reference rubber bale R until the opposite end $R_{L'}$ is brought into contact against the side of a blade Q (the blade Q being, for example, a cutting blade 18 of the system 10, a blade of a cutting subassembly 118, 118', 118" of system 100 or an equivalent, for example, an ultrasound blade). The linear actuator 200 operates in a known manner (for example, pneumatically, electrically or hydraulically). The blade Q has a reciprocating up-and-down movement. The length of the reference rubber bale R is determined by at least one position sensor as known to those skilled in the art (not shown). The cutting length and the cutting position of the first cut are calculated using the weight of the reference rubber bale R, which is either the predefined weight or the weight obtained by weighing the reference rubber bale R. Not knowing the shape of the reference rubber bale R, the first cut is imprecise and serves as a learning cut (the first cut is called the "learning cut"). It is expected that the target weight during the learning cut is not the exact weight remaining to obtain the required weight of the batch. For example, the required weight divided by 2 will be targeted during the learning cut.

Figure 21:
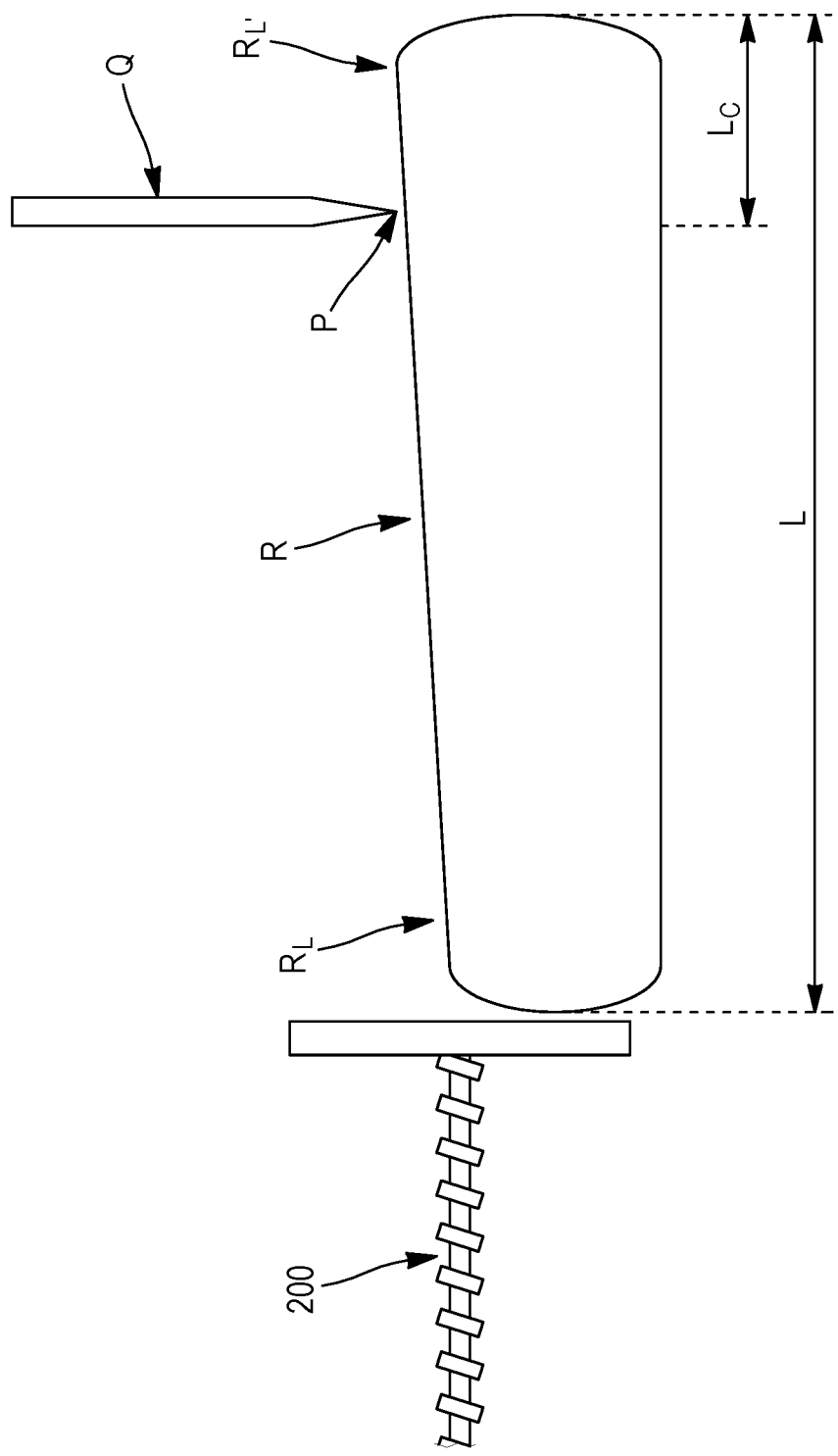

Referring to FIG. 21, the blade Q ascends to an upper position, and the linear actuator 200 presses the reference rubber bale R at its end $R_L$ to advance it to the cutting position P of the learning cut. Advancing the rubber bale R, the linear actuator 200 moves it along its length L to the cutting length $L_C$.

Figures 22A, 22B:
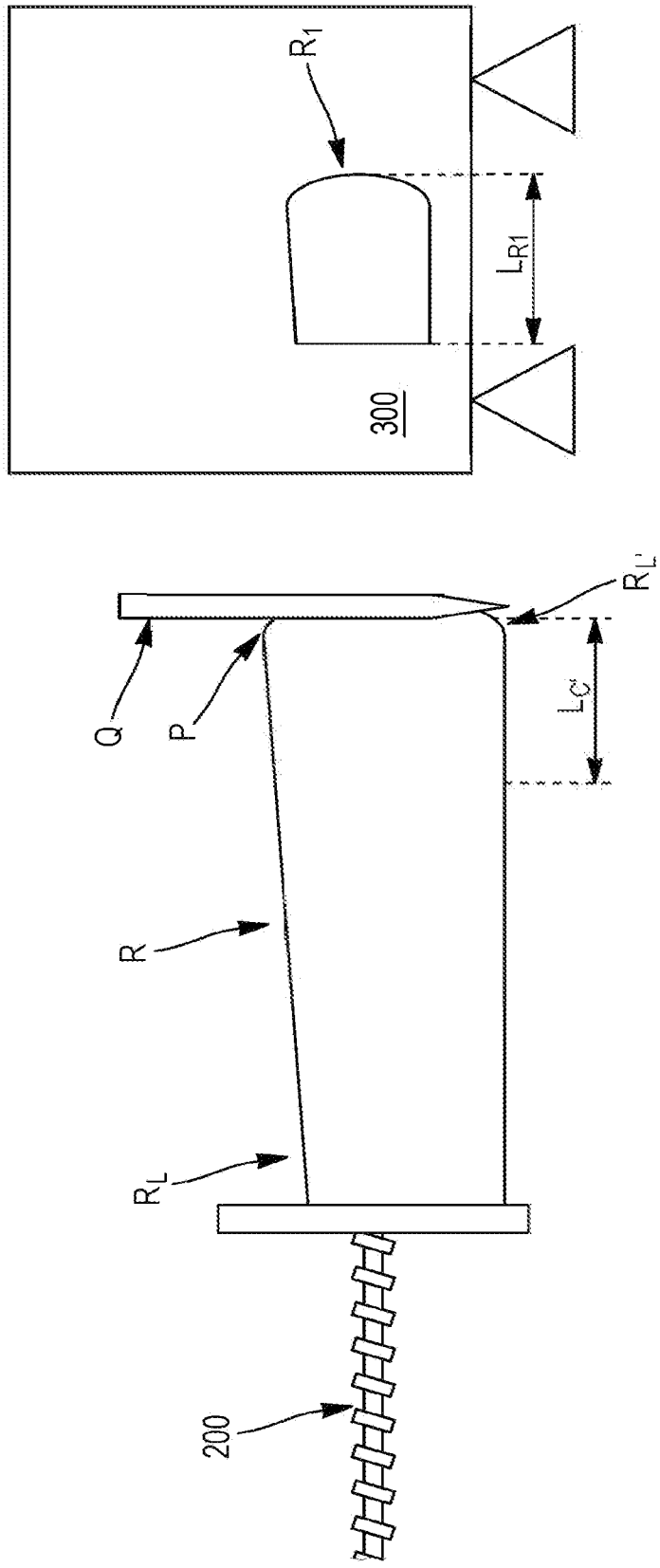

Referring to FIGS. 22A and 22B, the blade Q performs the learning cut at the cutting position P. The cut made at the position P is precisely made such that the "new" RL end has a very straight edge even if the reference rubber bale R is deformed. A first piece R1 is obtained by cutting the rubber bale R at the cutting position P. The first piece R1 is weighed (for example, by a scale 300), and its weight is used to obtain a real length LR1 of the first piece R1. On the basis of this weight of the first piece R1, a cutting length and a cutting position of a successive section are calculated to obtain a difference between a sum of the obtained weight (the weight of bales (AI, BI, CI) and the weight of pieces (AIJ, BIJ, CIJ)) and the required weight of the batch. By cutting in sections, learning and precision are improved.

Referring to FIGS. 23A and 23B, a cutting length (LC') and a cutting position (P+1) of a complementary cut are calculated using the actual weight and the actual length LR1 of the first piece R1 and a target weight of a complementary piece R2. To obtain the complementary piece R2, the blade Q performs the complementary cut at the cutting position P+1 of the reference rubber bale R remaining after the learning cut. The complementary piece R2 is weighed by the scale 300, and its weight is used to obtain a real length LR2 of the complementary piece.

Figure 24B:
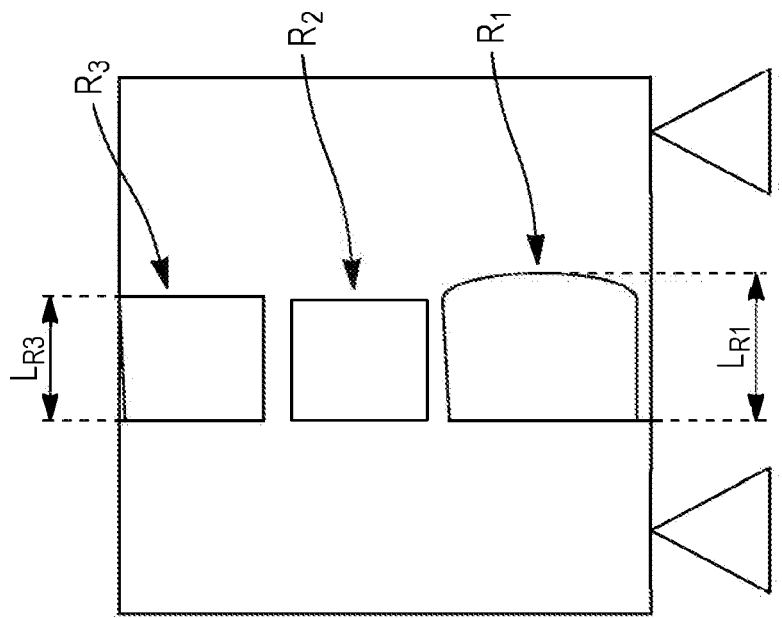
Figure 24A:
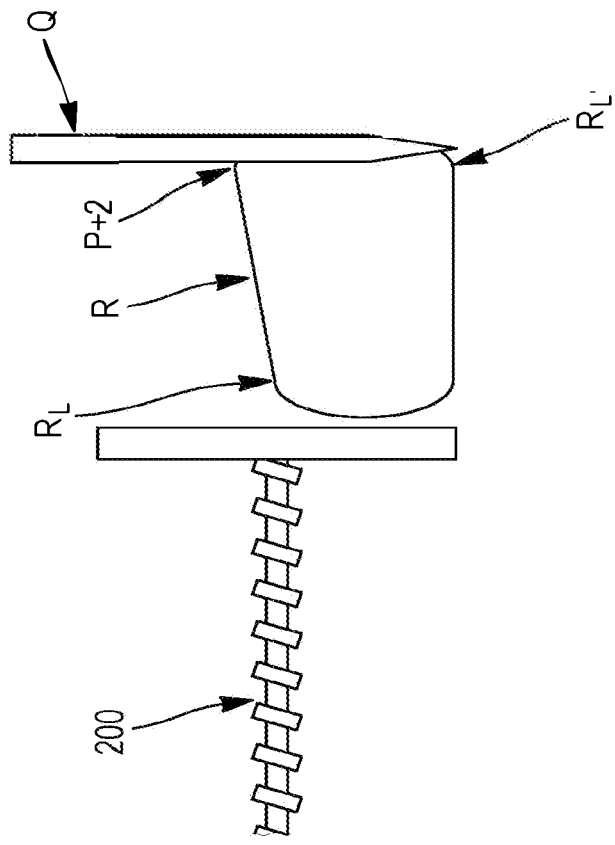

Referring to FIGS. 24A and 24B, a cutting length (LC") and a cutting position (P+2) are calculated using the actual weight and the length LR2 of the complementary piece R2 and a target weight of a final piece R3. To obtain the final piece R3, the blade Q effects the complementary cut at the cutting position P+2 of the reference rubber bale R remaining after the complementary cut. The final piece R3 is weighed by the scale 300, and its weight is used to obtain a real length LR3 of the final piece.

The disclosed method is not limited to three cuts. On the basis of a sum of the weights of the first piece $R_1$, the complementary piece $R_2$ and the final piece $R_3$, if necessary, a cutting length and a cutting position of another successive section are calculated using this sum of weights of pieces $R_N$ (where N varies from 4 to N) obtained from the reference rubber bale R. The step that determines the cutting length and the cutting position can be done iteratively until the sum of weight of the bales ($A_I$, $B_I$, $C_I$), the weight of the pieces ($A_{IJ}$, $B_{IJ}$, $C_{IJ}$) and the weights of the pieces ($R_1$, $R_2$, $R_3$, $R_N$) is equal to the required weight of the batch in a proportion corresponding to a predetermined proportion. That is, the missing weight relative to the required weight of the batch is within an acceptable tolerance relative to the theoretical weight of the batch.

EXAMPLE

Referring to the system 10 of FIGS. 1 to 15, the weighing station 20 receives the sum of the detected weight of bales $A_1$, $B_1$, $C_1$ and a detected weight of the pieces $A_{11}$, $A_{12}$ and $B_{11}$. This sum is equal to 130 kg. The sum of the detected weights is then compared with the required weight of the batch that is equal to 150 kg. To achieve the required batch weight in a proportion corresponding to the predetermined proportion, the difference must be obtained by cutting a rubber bale that is selected in a predetermined nature that corresponds to a selected batch. A targeted weight to achieve this difference is equal to 20 kg.

Referring to FIGS. 20 and 21, the reference rubber bale R is disposed between a linear actuator 200 that adjusts its position and a blade Q that cuts the bale (in this example, the blade Q is a cutting blade 18 of the system 10). The weight of the reference rubber bale R is equal to about 34 kg. The predefined length L of the reference rubber bale R is approximately 700 mm.

The linear actuator 200 adjusts the position of the reference rubber bale R until the opposite end $R_{L'}$ is brought into contact against the side of the blade Q. Using the weight of the reference rubber bale R ($W_R$) and a target weight of the reference section ($W_C$), the section length $L_C$ and thus the section position P of a learning section are calculated:

$W_C$=Target weight/2=20 kg/2=10 kg $P=L_C=(W_C/W_R)*L=(10\ kg/34\ kg)*700\ mm=206\ mm$ The linear actuator 200 moves the reference rubber bale R along its length L to the calculated length $L_C$. The blade Q descends to cut the bale at the cutting position P and to obtain the first piece $R_1$.

Referring to FIGS. 22A, 22B, 23A and 23B, the first piece R1 has a real length LR1 that is equal to 206 mm (which corresponds to the length LC). The first piece R1 is weighed and its weight is equal to 11 kg. There are 9 kg remaining to attain the required weight of the batch. Using the weight of the first piece R1 (WR1), a target weight of a complementary cut (WC+1) and the actual length LR1, the position of the cut (P+1) of a complementary cut is calculated:

$WC+1=9\ kg/2=4.5\ kg$ $P+1=((WC+1)/(WR1))*LR1=(4.5/11)*206\ mm=84\ mm$

The linear actuator 200 moves the reference rubber bale R referential along its length L to the cutting position P+1. The blade Q descends to cut the bale at the cutting position P+1 and to obtain the complementary piece $R_2$.

The complementary piece $R_2$ has a real length $L_{R2}$ that equals 84 mm. The complementary piece $R_2$ is weighed and its weight is equal to 4.3 kg. There are 4.7 kg remaining to attain the required weight of the batch.

Referring to FIGS. 24A and 24B, using a target weight of a final cut (WCF), the remaining weight of the calculations already made (WF) and the actual length LR2, the position of the cut P+2 of a final cut is calculated:

$P+2=((WCF)/(WF))*LR2=(4.7/4.5)*84\ mm=89\ mm$

The linear actuator 200 moves the reference rubber bale R referential along its length L to the cutting position P+2. The blade Q descends to cut the bale at the cutting position P+2 to obtain a final piece $R_3$ that is weighed, and its weight is equal to 4.6 kg. The weight of 0.1 kg missing relative to the required weight of the batch is within an acceptable tolerance relative to the theoretical weight of the batch.

For all embodiments, a system could be set up to ensure the reproducibility of the location and position of each bale and/or each piece. Verification can be done by a known means, including "vision detection" that can be manual or automated (for example, with one or more cameras in communication with a PLC). An example is a camera system configured to create an image of the pieces and slices as explained in Japanese Patent JP6-190783. The system can be configured to determine an optimized cutting solution. The PLC is configured to control the cutting of the bale relative to the optimized cutting solution, in pieces of required weight and within the prescribed tolerance. The accuracy of the cutting and weighing during each batch creation cycle is thus respected.

The invention provides dosage efficiency without degrading the final properties of the mixed batch. The result is the increase in productivity without a proportionate increase in budgetary costs and cycle times. These short cycle times are achieved with minimal manual intervention, thus providing the required accuracy.

At least some of the various described techniques can be implemented in connection with hardware or software or, if warranted, with a combination of both. For example, an electrical data processing functionality may be used to implement any aspect of computing and power adjustment, including implementation in relation to a computing device (including a mobile networking device) that includes hardware, software or, if warranted, a combination of both. A server may be further configured to facilitate communication between at least one module as described and one or more of the computing devices.

While particular embodiments of the disclosed apparatus have been illustrated and described, it will be understood that various changes, additions and modifications may be made without departing from the spirit and scope of the present disclosure. Accordingly, no limitation should be imposed on the scope of the invention described with the exception of those set forth in the appended claims.

The invention claimed is:

1. A method for creating batches of unvulcanized rubber before mixture in a rubber mixer, including selecting at least one batch for mixing in the rubber mixer, wherein each batch corresponds to a selection of uncured rubber bales ($A_I$, $B_I$, $C_I$) that correspond to natures (A, B, C) of rubber composition having predetermined characteristics, comprising the steps of:
providing a supply station where the uncured rubber bales ($A_I$, $B_I$, $C_I$) are supplied from the corresponding natures (A, B, C);
selecting uncured rubber bales ($A_I$, $B_I$, $C_I$) from natures (A, B, C) and in a predetermined proportion corresponding to a selected batch at the supply station;
providing a cutting station for cutting at least one uncured rubber bale ($A_I$, $B_I$, $C_I$) into pieces ($A_{IJ}$, $B_{IJ}$, $C_{IJ}$);
providing a transport system that feeds the cutting station and transfers the uncured rubber bales ($A_I$, $B_I$, $C_I$) and the pieces ($A_{IJ}$, $B_{IJ}$, $C_{IJ}$) to the rubber mixer;
weighing the uncured rubber bales ($A_I$, $B_I$, $C_I$) and the pieces ($A_{IJ}$, $B_{IJ}$, $C_{IJ}$) to obtain a sum of a weight of the uncured rubber bales ($A_I$, $B_I$, $C_I$) and a weight of the pieces ($A_{IJ}$, $B_{IJ}$, $C_{IJ}$);
comparing the sum obtained with a required weight of the selected batch, which is created by mixing different kinds and different grades of elastomers; and
obtaining, in a proportion corresponding to the predetermined proportion, a target weight to attain a difference between the sum obtained and the required weight of the selected batch,
wherein the uncured rubber bales ($A_I$, $B_I$, $C_I$) and the pieces ($A_{IJ}$, $B_{IJ}$, $C_{IJ}$) are transported between the supply station, the cutting station and the rubber mixer according to a sequence determined by the equivalence between the required weight of the selected batch and (a) the weight of the uncured rubber bales ($A_I$, $B_I$, $C_I$) or (b) a sum of the weight of the uncured rubber bales ($A_I$, $B_I$, $C_I$) and a weight of the pieces ($A_{IJ}$, $B_{IJ}$, $C_{IJ}$), and
wherein the step of obtaining a target weight further comprises the following steps:
providing a reference rubber bale (R) of a nature (A, B, C) and a predetermined proportion that corresponds to a batch at the bale supply station, the reference rubber bale (R) having a predefined weight and a predefined length (L) between one end ($R_L$) and an opposite end ($R_{L'}$); and
determining a cutting length ($L_C$) and a cutting position (P) of a learning cut of the reference rubber bale (R) that are required to obtain the required weight of the selected batch.

2. The method of claim 1, wherein the step of determining the cutting length ($L_C$) and the cutting position (P) comprises the following steps:
adjusting a position of the reference rubber bale (R) until the opposite end ($R_{L'}$) is brought into contact against a side of a blade (Q) that performs the step of cutting the reference rubber bale (R) at the cutting position (P);
weighing the reference rubber bale (R);
calculating the cutting length ($L_C$) and the cutting position (P) of the learning cut using a weight of the reference rubber bale (R), which is either the predefined weight or the weight obtained by weighing the reference rubber bale (R);
cutting the reference rubber bale (R) at the cutting position (P) of the learning cut; and
weighing a first piece ($R_1$) that is obtained by cutting the reference rubber bale (R) at the cutting position (P) to obtain a real weight of the first piece ($R_1$).

3. The method of claim 2, wherein the step of adjusting the position of the reference rubber bale (R) is performed by a linear actuator that contacts the end ($R_L$).

4. The method of claim 2, further comprising the steps of:
calculating a cutting length ($L_{C'}$) and a cutting position (P+1) of a successive cut using the weight and a length ($L_{R1}$) obtained from the first piece ($R_1$) and a target weight of a complementary piece ($R_2$);
cutting the reference rubber bale (R) at the cutting position (P+1) of the successive cut; and
weighing the complementary piece ($R_2$) that is obtained by cutting the reference rubber bale (R) at the cutting position (P+1) of the successive cut to obtain a real weight of the complementary piece ($R_2$).

5. The method of claim 4, further comprising the steps of:
calculating a cutting length ($L_{C''}$) and a cutting position (P+2) of a final cut using the weight and a length ($L_{R2}$) obtained from the complementary piece ($R_2$) and a target weight of a final piece ($R_3$);
cutting the reference rubber bale (R) at the cutting position (P+2); and
weighing the final piece ($R_3$) that is obtained by cutting the reference rubber bale (R) at the cutting position (P+2) to obtain a real weight of the final piece ($R_3$) remaining after the complementary cut.

6. The method according to claim 5, wherein the step of determining a cutting length and a cutting position is performed iteratively until a sum obtained of the weight of the uncured rubber bales ($A_I$, $B_I$, $C_I$), the weight of the pieces ($A_{IJ}$, $B_{IJ}$, $C_{IJ}$) and a weight of the pieces ($R_1$, $R_2$, $R_3$, $R_N$) obtained from the reference rubber bale is equal to the required weight of the selected batch in a proportion corresponding to the predetermined proportion.

7. The method of claim 1, further comprising the steps of:
providing a weighing station for weighing the uncured rubber bales ($A_I$, $B_I$, $C_I$) and the pieces ($A_{IJ}$, $B_{IJ}$, $C_{IJ}$); and
providing a storage station for holding the pieces ($A_{IJ}$, $B_{IJ}$, $C_{IJ}$) between successive cycles of batch creation.

8. The method of claim 1, wherein the transport system comprises:
a feed belt for feeding the cutting station; and
conveyor belts carrying the uncured rubber bales ($A_I$, $B_I$, $C_I$) and the pieces ($A_{IJ}$, $B_{IJ}$, $C_{IJ}$) in order to feed the rubber mixer for batch creation, wherein the conveyor belts comprise at least one scale.

9. The method of claim 8, further comprising the step of weighing the pieces ($A_{IJ}$, $B_{IJ}$, $C_{IJ}$) in order to obtain the sum of the weight of the uncured rubber bales ($A_I$, $B_I$, $C_I$) and the weight of the pieces ($A_{IJ}$, $B_{IJ}$, $C_{IJ}$).

10. The method of claim 1, further comprising the step of storing the pieces ($A_{IJ}$, $B_{IJ}$, $C_{IJ}$) for the next cycle of batch creation, wherein a cumulative weight of the stored pieces is compared to a required weight of a next batch.

11. The method of claim 1, further comprising programming sequences for the transport system such that a predetermined sequence can be selected from a plurality of sequences.

12. The method of claim 1, further comprising mixing the selected batch in the rubber mixer.

13. A system for creating unvulcanized rubber batches prior to mixing them in a rubber mixer, including a selection of at least one batch for mixing in the rubber mixer, wherein each batch corresponds to a selection of uncured rubber bales ($A_I$, $B_I$, $C_I$), that correspond to natures of rubber composition (A, B, C) having predetermined characteristics, the system comprising:
a bale supply station where uncured rubber bales ($A_I$, $B_I$, $C_I$) are provided from the corresponding natures;
a cutting station that cuts at least one bale ($A_I$, $B_I$, $C_I$) into pieces ($A_{IJ}$, $B_{IJ}$, $C_{IJ}$);
a weighing station for weighing the uncured rubber bales ($A_I$, $B_I$, $C_I$) and the pieces ($A_{IJ}$, $B_{IJ}$, $C_{IJ}$) removed therefrom;
a transport system that transfers the uncured rubber bales ($A_I$, $B_I$, $C_I$) and the rubber pieces ($A_{IJ}$, $B_{IJ}$, $C_{IJ}$) to the rubber mixer and transports the uncured rubber bales ($A_I$, $B_I$, $C_I$) and the pieces ($A_{IJ}$, $B_{IJ}$, $C_{IJ}$) between the supply station, the cutting station and the rubber mixer according to a sequence determined by attaining an equivalence between a sum of a bale weight of the uncured rubber bales ($A_I$, $B_I$, $C_I$) and a weight of the pieces ($A_{IJ}$, $B_{IJ}$, $C_{IJ}$) and a required weight of the batch in a proportion corresponding to a predetermined proportion; and
at least one linear actuator that adjusts a position of a reference rubber bale (R) of a predetermined rubber nature and proportion that corresponds to a selected batch at the bale supply station, the provided reference rubber bale (R) having a predefined weight and a predefined length (L) between one end ($R_L$) and an opposite end ($R_{L'}$), until the opposite end ($R_{L'}$) is brought into contact against a side of a blade (Q) that performs a step of cutting the reference rubber bale (R) at the position (P) of a learning cut.

14. The system of claim 13, wherein the blade (Q) is provided at the cutting station to perform a step of determining cutting lengths ($L_C$, $L_{C'}$, $L_{C''}$) and cutting positions (P, P+1, P+2) of the reference rubber bale (R) to attain a difference between the sum of the weight of the uncured rubber bales ($A_I$, $B_I$, $C_I$) and the weight of the pieces ($A_{IJ}$, $B_{IJ}$, $C_{IJ}$) and the required weight of the batch.

15. The system of claim 14, wherein the system performs the step of determining cutting lengths and cutting positions iteratively until a sum of the weight of the uncured rubber bales ($A_I$, $B_I$, $C_I$), the weight of the pieces ($A_{IJ}$, $B_{IJ}$, $C_{IJ}$) and a weight of the pieces ($R_1$, $R_2$, $R_3$, $R_N$) obtained from the reference rubber bale (R) is equal to the required weight of the batch in a proportion corresponding to the predetermined proportion.

16. The system of claim 13, wherein the transport system comprises:
a feed belt for feeding the cutting station; and
conveyor belts carrying the uncured rubber bales ($A_I$, $B_I$, $C_I$) and the pieces ($A_{IJ}$, $B_{IJ}$, $C_{IJ}$) to the rubber mixer for batch creation, wherein the conveyor belts comprise at least one scale.

17. The system of claim 13, further comprising the rubber mixer for mixing the batch.

18. An assembly for manufacturing tires comprising the system of claim 13.

* * * * *